United States Patent
Steven

(10) Patent No.: US 11,635,322 B2
(45) Date of Patent: Apr. 25, 2023

(54) SYSTEM AND METHOD FOR METERING FLUID FLOW

(71) Applicant: Richard Steven, Johnstown, CO (US)

(72) Inventor: Richard Steven, Johnstown, CO (US)

( * ) Notice: Subject to any disclaimer, the term of this patent is extended or adjusted under 35 U.S.C. 154(b) by 288 days.

(21) Appl. No.: 16/590,844

(22) Filed: Oct. 2, 2019

(65) Prior Publication Data

US 2020/0132535 A1     Apr. 30, 2020

Related U.S. Application Data

(60) Provisional application No. 62/739,908, filed on Oct. 2, 2018.

(51) Int. Cl.
| | | |
|---|---|---|
| G01F 25/10 | (2022.01) | |
| G01F 1/44 | (2006.01) | |
| G01F 1/40 | (2006.01) | |
| G01F 1/50 | (2006.01) | |

(52) U.S. Cl.
CPC .............. *G01F 25/10* (2022.01); *G01F 1/44* (2013.01); *G01F 1/40* (2013.01); *G01F 1/50* (2013.01)

(58) Field of Classification Search
CPC .... G01F 25/0053; G01F 25/0007; G01F 1/40; G01F 1/44; G01F 1/50
See application file for complete search history.

(56) References Cited

U.S. PATENT DOCUMENTS

| | | | | |
|---|---|---|---|---|
| 8,136,414 | B2 | 3/2012 | Steven | |
| 2005/0081643 | A1* | 4/2005 | Mattar | G01F 1/74 73/861.355 |
| 2010/0191481 | A1* | 7/2010 | Steven | G01F 1/88 702/47 |
| 2011/0259119 | A1* | 10/2011 | Steven | G01F 1/40 73/861.42 |
| 2016/0084687 | A1* | 3/2016 | Steven | G01F 25/10 73/861.42 |
| 2016/0238423 | A1* | 8/2016 | Steven | G01F 1/366 |

OTHER PUBLICATIONS

Steven, A Gran Chimera? Flowrate Prediction Biases of a Malfunctioning Orifice Meter Calculated in Real Time via Internal Meter Diagnostics, North Sea Flow Measurement Workshop Oct. 22-24, 2018 (Year: 2018).*
Rabone, Advanced DP Meter Diagnostics—Developing Dynamic Pressure Field Monitoring (& Other Developments), 32nd International North Sea Flow Measurement Workshop Oct. 21-24, 2014 (Year: 2014).*

\* cited by examiner

*Primary Examiner* — Michael J Dalbo
(74) *Attorney, Agent, or Firm* — Ruggiero McAllister & McMahon LLC

(57) ABSTRACT

A system and method for metering fluid flow is disclosed which has improved diagnostic capabilities. As well as informing a flow meter operator of the presence of a malfunction and its likely cause, the new systems and methods can also quantify an associated flow prediction bias.

15 Claims, 18 Drawing Sheets

SYSTEM AND METHOD FOR METERING FLUID FLOW

Figure 1B:
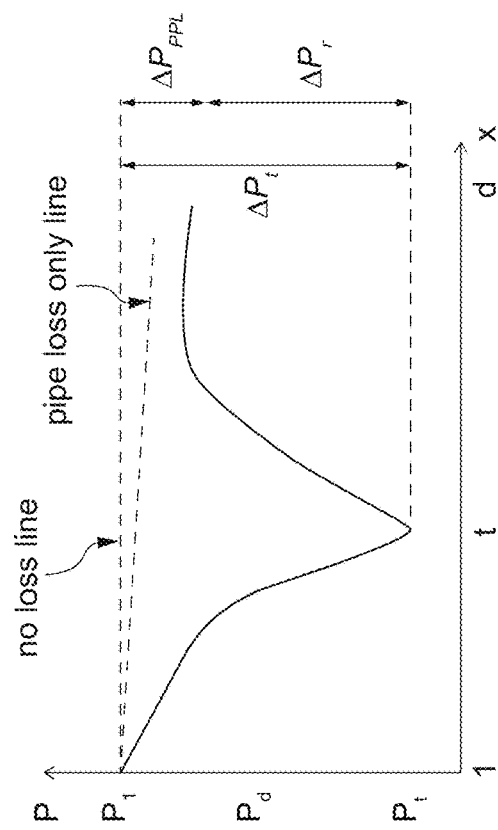

The present disclosure relates to a system and method for metering fluid flow, and in particular but not exclusively to a system to quantify a flow prediction bias of a malfunctioning flow meter such as a differential pressure (DP) flow meter.

BACKGROUND

Pipeline system operators install and operate a flow meter when there is an operational necessity to know the flowrate in that pipe. As they need the meter, they also want reassurance that they can trust the meter. Therefore, as no flow meter is infallible there is a drive for all modern flow meters to have self-contained internal verification systems. Flow meter verifications systems are arguably the cutting edge of flow meter technology.

These verification systems are based on multiple individual diagnostic checks derived from various analytical methods applied to the meter instrumentation's primary signals. The combined set of any meter's various diagnostic checks is commonly called the meter's 'diagnostic suite'. Such diagnostic suite verification systems ensure the user that a meter malfunction will not go un-noticed.

Existing diagnostic suites can indicate when something is wrong and provide some indication of what is wrong.

However, there is currently no way of telling the operator the associated flow prediction bias. A flow prediction bias is quantified information about an error that is present in a given flow measurement that is output by a flow meter.

SUMMARY

According to a first aspect of the disclosure there is provided a method of metering fluid flow, comprising:
 making one or more fluid flow rate measurements;
 performing one or more diagnostic tests on meter performance characteristics;
 identifying a specific problem based on outputs of the diagnostic tests;
 quantifying the magnitude of the specific problem via analysis of the diagnostic tests; and
 predicting a quantified fluid flow rate bias based on the quantified magnitude of the specific problem.

Optionally, performing one or more diagnostic tests comprises performing one or more objective diagnostic tests.

Optionally, performing one or more diagnostic tests comprises performing one or more subjective diagnostic tests.

Optionally, performing one or more diagnostic tests comprises performing a combination of one or more objective diagnostic tests with one or more subjective diagnostic tests.

An objective diagnostic check is a measurement that yields a quantitative objective numerical result. It compares a measureable diagnostic value to a baseline fixed by physical law. An objective diagnostic check contrasts with a subjective diagnostic check, which is a measurement derived from comparison with intuition, opinion, or some general rule of thumb set by experience.

A fluid flow rate bias is defined as an estimated error in a fluid flow rate reading; or an error that is expected to be contributed by a specific flow meter to a specific flow rate measurement.

Optionally, identifying a specific problem comprises applying pattern recognition to the results of the performed diagnostic tests.

Optionally, the method further comprises applying said quantified fluid flow rate bias as a correction factor to derive a true fluid flow rate from a measured fluid flow rate.

Optionally, the method is applied while a flow metering device is in-situ.

Optionally, measuring a fluid flow rate comprises measuring a differential pressure and calculating a flow rate based on said measured differential pressure.

Optionally, measuring one or more fluid flow rates comprises measuring two or more of a traditional differential pressure, a recovered differential pressure and a permanent pressure loss differential pressure.

According to a second aspect of the disclosure there is provided a method of, in a fluid flow metering system, using one or more diagnostic tests to determine a quantified magnitude of a detected malfunction source and to predict a quantified flow bias.

According to a third aspect of the disclosure there is provided a flow metering system comprising a flow meter and a flow analyzer, said flow analyzer comprising:
 (i) a diagnostics suite configured to make one or more fluid flow rate measurements, perform one or more diagnostic tests on meter performance characteristics, and identify a specific problem based on outputs of the diagnostic tests; and
 (ii) a bias prediction module configured to quantify the magnitude of the specific problem, and predict a quantified fluid flow rate bias based on the quantified magnitude of the specific problem.

Optionally, the diagnostic tests performed by the diagnostics suite comprise one or more objective diagnostic tests.

Optionally, the diagnostic tests performed by the diagnostics suite comprise one or more subjective diagnostic tests.

Optionally, the diagnostic tests performed by the diagnostics suite comprise a combination of one or more objective diagnostic tests with one or more subjective diagnostic tests.

Optionally, identifying a specific problem comprises applying pattern recognition to the results of the performed diagnostic tests.

Optionally, the flow analyzer is further configured to apply said quantified fluid flow rate bias as a correction factor to derive a true fluid flow rate from a measured fluid flow rate.

Optionally, the flow analyzer is arranged to predict a quantified fluid flow rate bias based on the quantified magnitude of the specific problem while the flow meter is in-situ.

Optionally, the flow meter comprises a differential pressure fluid flow meter.

Optionally, the differential pressure fluid flow meter comprises one of: a venturi meter, a cone meter, an orifice plate meter.

Optionally, the differential pressure fluid flow meter is provided with a plurality of pressure taps that are arranged to provide two or more of a traditional differential pressure, a recovered differential pressure and a permanent pressure loss differential pressure.

According to a fourth aspect of the disclosure there is provided a computer program product comprising:
 (i) a diagnostics suite configured to make one or more fluid flow rate measurements, perform one or more diagnostic tests on meter performance characteristics, and identify a specific problem based on outputs of the diagnostic tests; and (ii) a bias prediction module configured to quantify the magnitude of the specific problem, and predict a quantified fluid flow rate bias based on the quantified magnitude of the specific problem.

The computer program product may be stored on or transmitted as one or more instructions or code on a computer-readable medium. Computer-readable media includes both computer storage media and communication media including any medium that facilitates transfer of a computer program from one place to another. A storage media may be any available media that can be accessed by a computer. By way of example such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fibre optic cable, twisted pair, digital subscriber line (DSL), or wireless technologies such as infra-red, radio, and microwave, then the coaxial cable, fibre optic cable, twisted pair, DSL, or wireless technologies such as infra-red, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

Figure 1A:
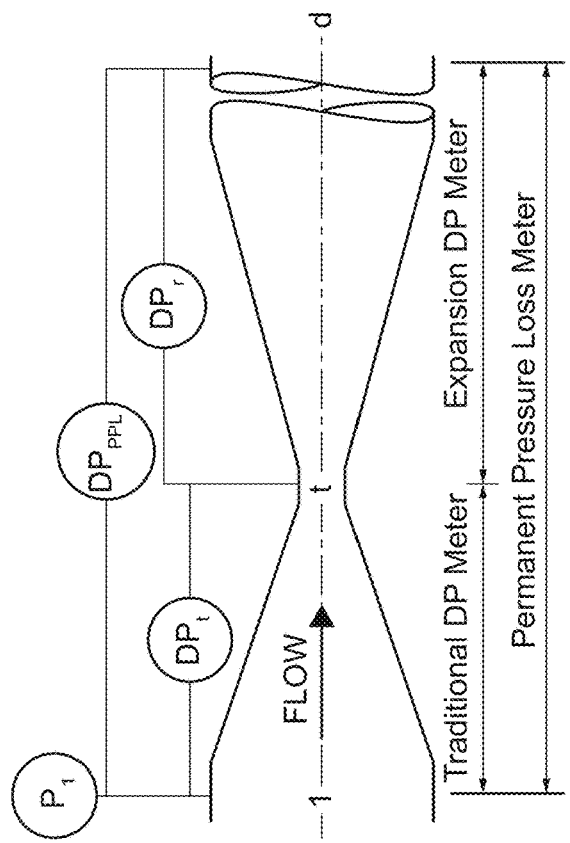

The disclosure will be described below, by way of example only, with reference to the accompanying drawings. The following listings provide brief descriptions of the contents of each figure, viz:

FIGS. 1a and 1b. Venturi meter with instrumentation sketch and pressure fluctuation graph.

Figure 2B:
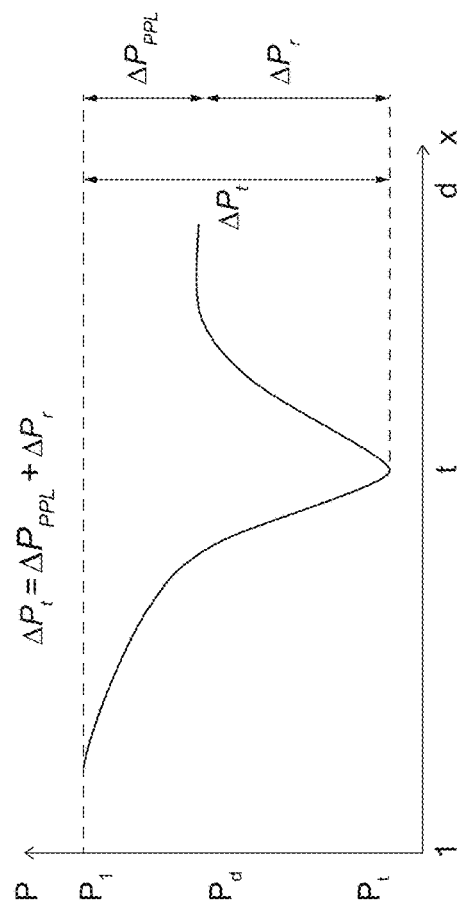
Figure 2A:
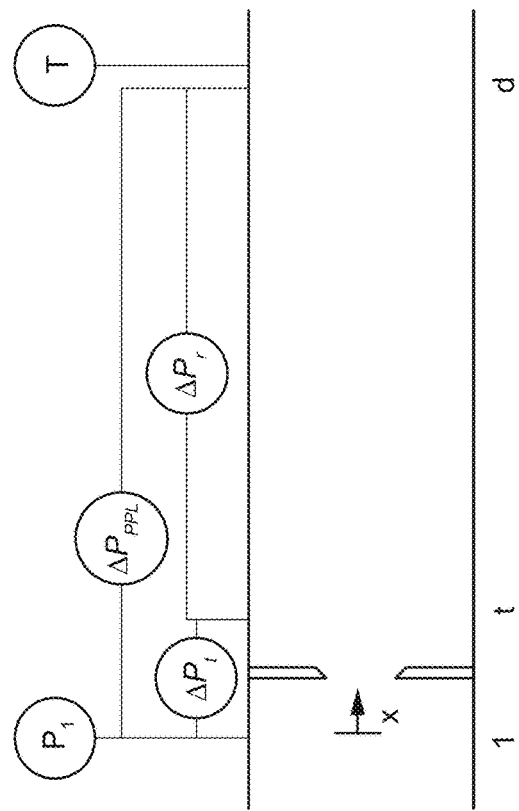

FIGS. 2a and 2b. Orifice plate meter with instrumentation sketch and pressure fluctuation graph.

Figure 3B:
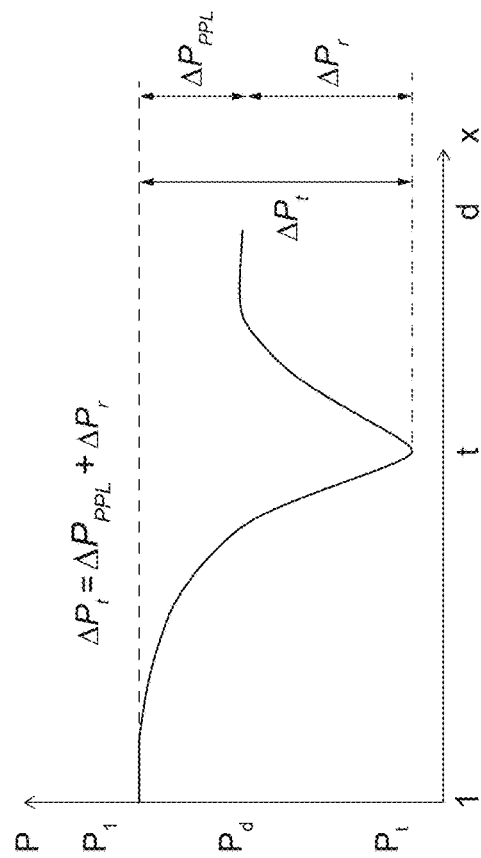
Figure 3A:
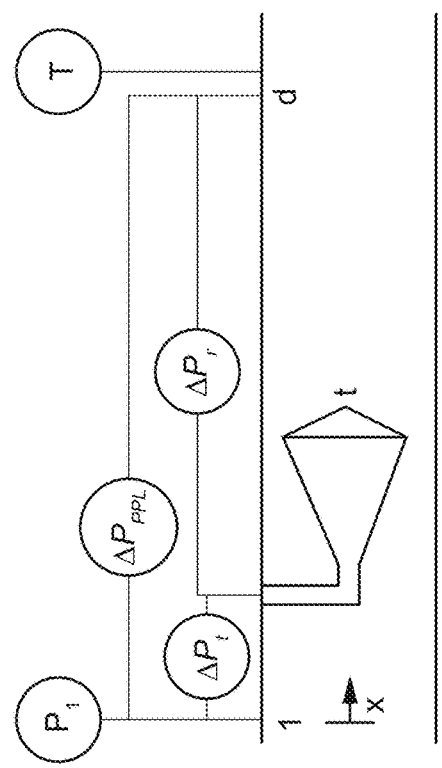

FIGS. 3a and 3b. Cone Meter Sketch with Instrumentation and pressure fluctuation graph.

Figure 4:
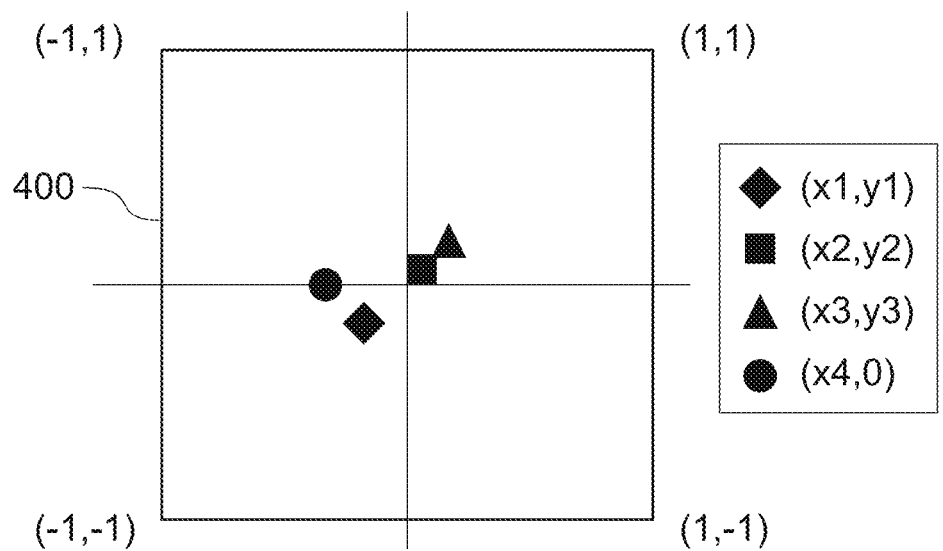

FIG. 4. Normalized Diagnostic Box (NDB) Display.

Figure 5:
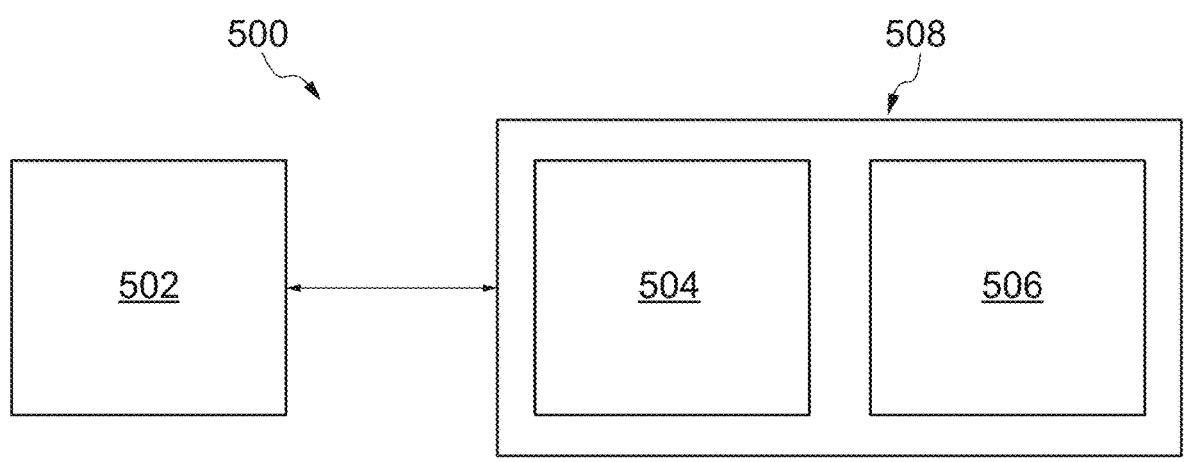

FIG. 5. Flow metering system according to the disclosure.

Figure 6:
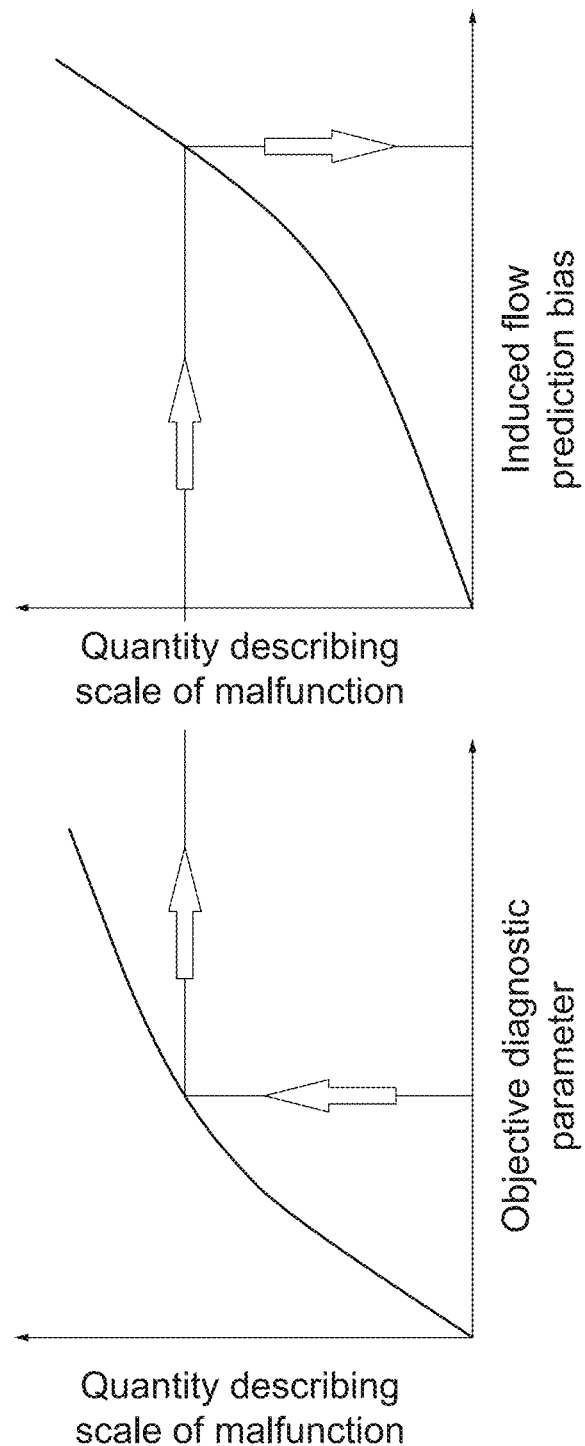

FIG. 6. The Essence of the DP Meter Diagnostic System Development in Graphical Form.

Figure 7:
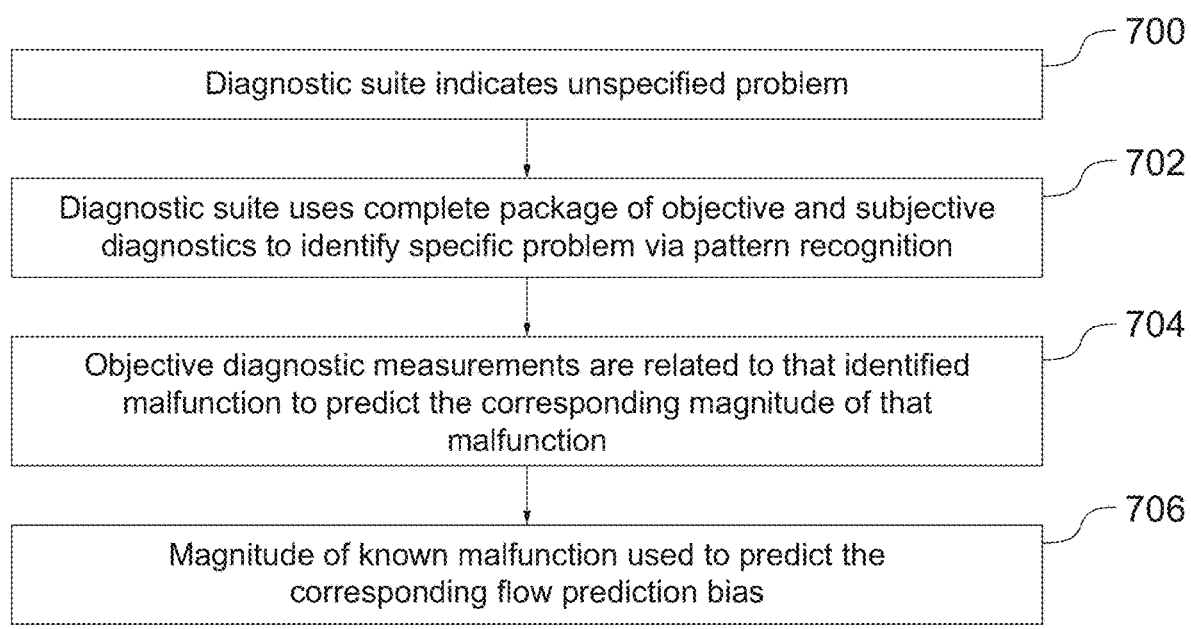

FIG. 7. Flow Chart of the Required Sequence to Adapt a Flow Meter Diagnostic System to One That Can Predict the Flow Prediction Bias from a General List of Common Malfunctions.

Figure 8:
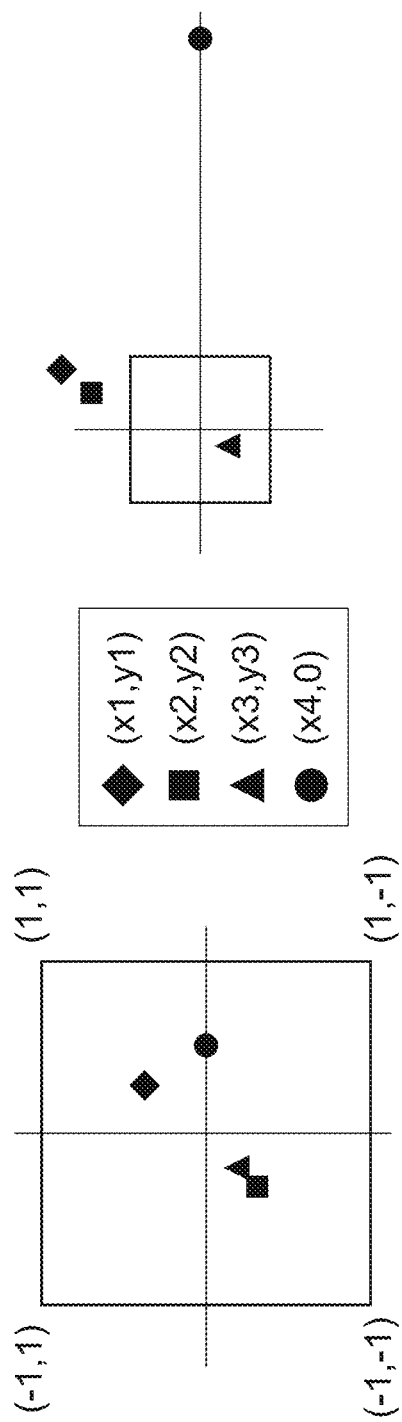

FIG. 8. DP Meter Diagnostic Display Showing Correct Orifice Meter Operation (Left Side) and Erroneous ΔPt Reading (Right Side).

Figure 9:
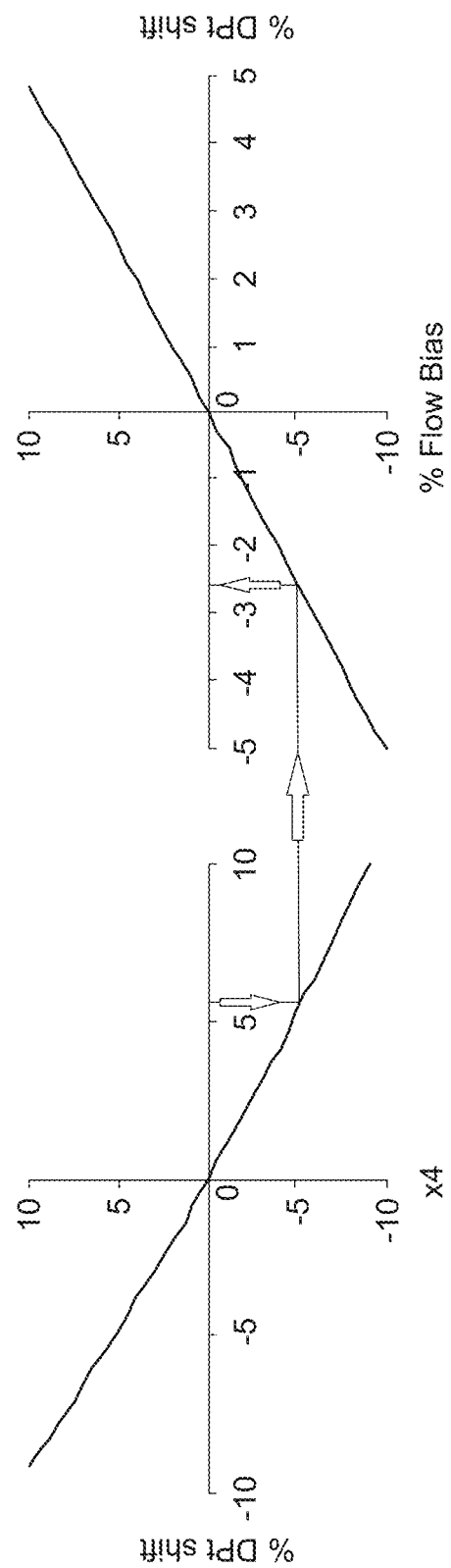

FIG. 9. DP Meter Objective Diagnostic vs. ΔPt Reading Bias vs. Flow Prediction Bias.

Figure 10:
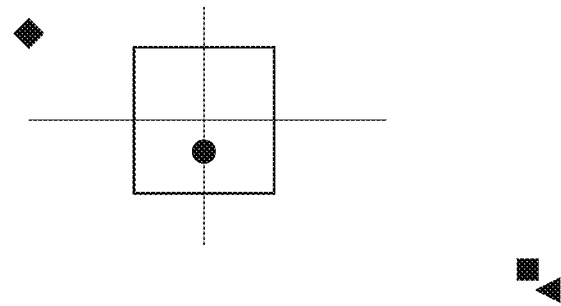
Figure 10:
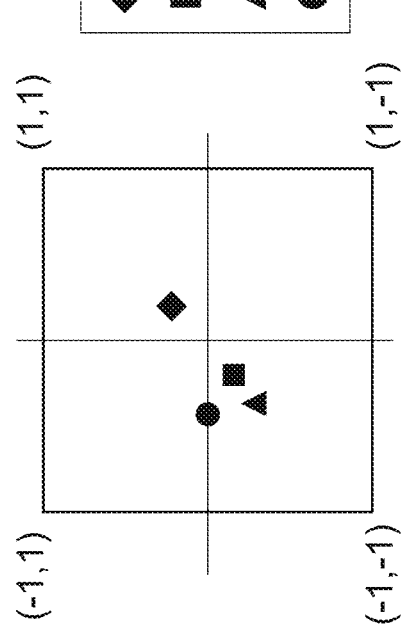

FIG. 10. DP Meter Diagnostic Display Showing Correct Orifice Meter Operation (Left Side) and Low Inlet Diameter Erroneously Used in Flow Calculations (Right Side).

Figure 11:
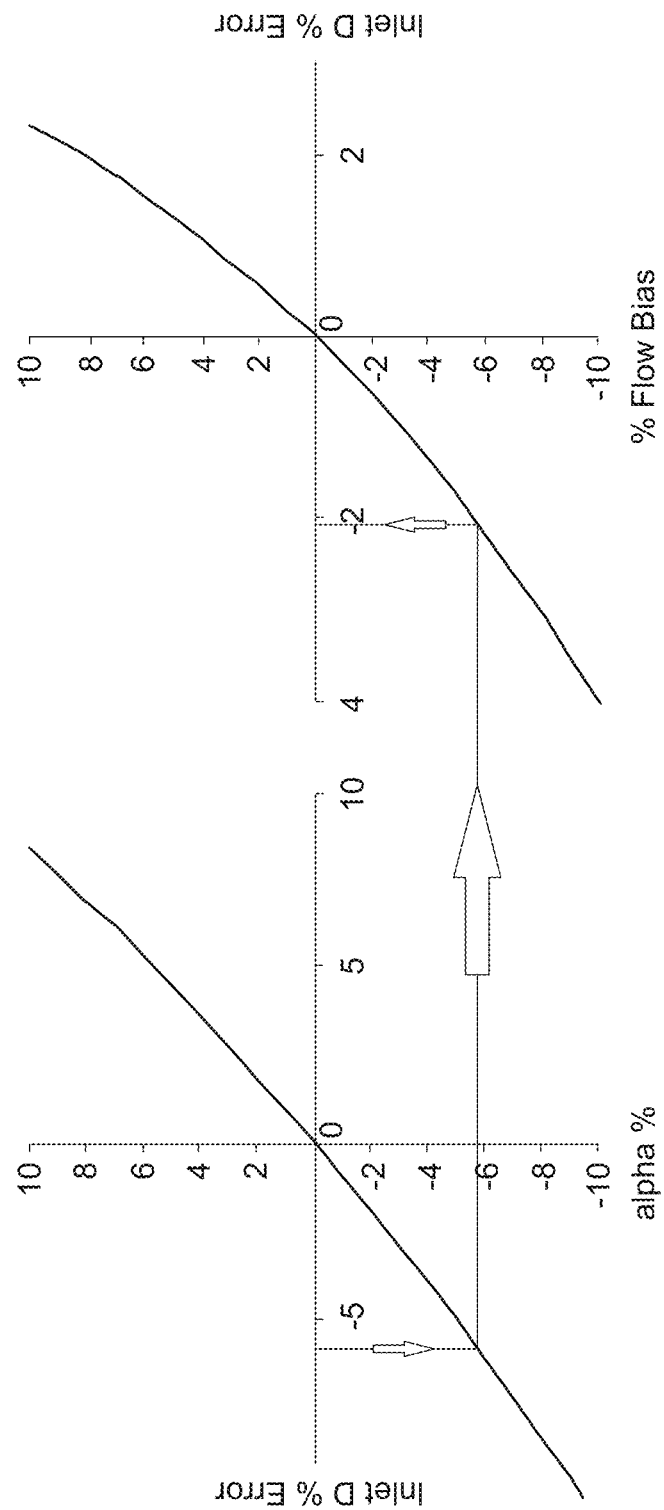

FIG. 11. DP Meter Objective Diagnostic vs. Inlet Diameter Error vs. Flow Prediction Bias.

Figure 12:
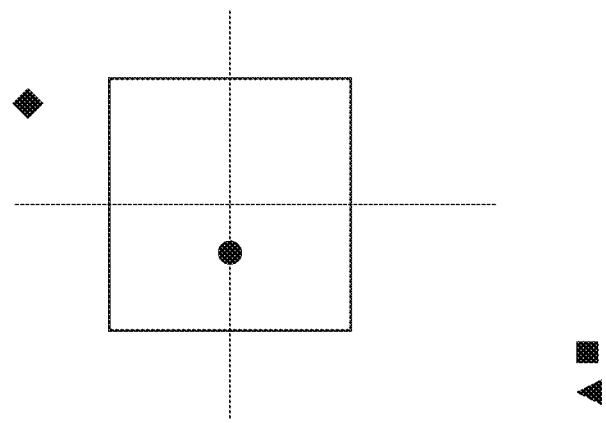
Figure 12:
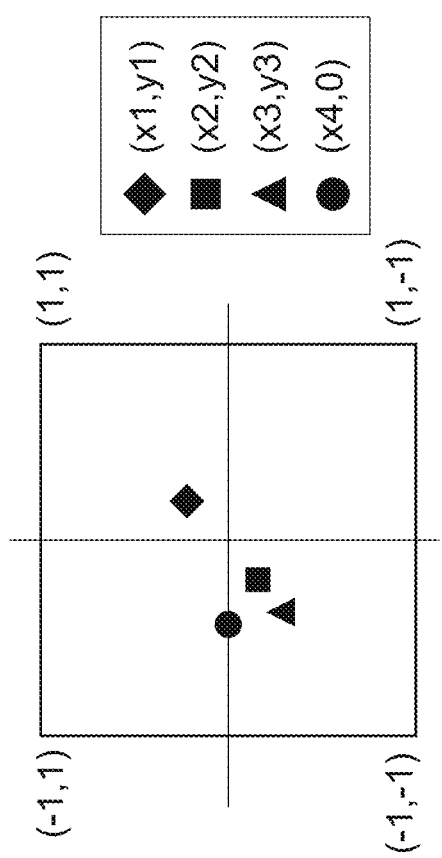

FIG. 12. DP Meter Diagnostic Display Showing Correct Orifice Meter Operation (Left Side) and High Orifice Diameter Erroneously Used in Flow Calculations (Right Side).

Figure 13:
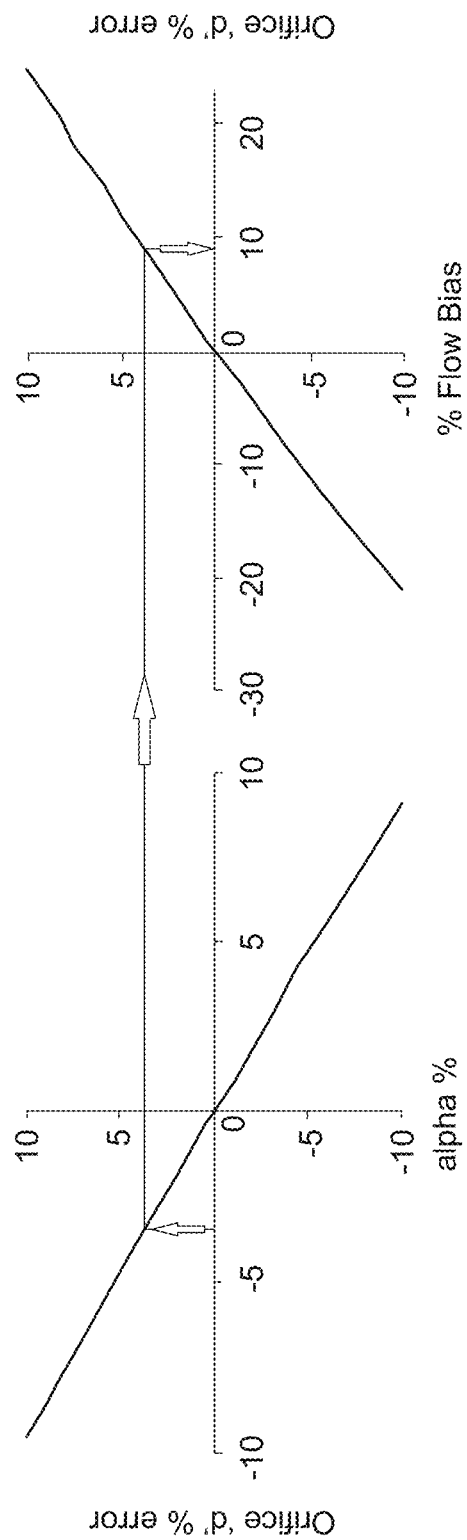

FIG. 13. DP Meter Objective Diagnostic vs. Orifice 'd' Error vs. Flow Prediction Bias.

Figure 14:
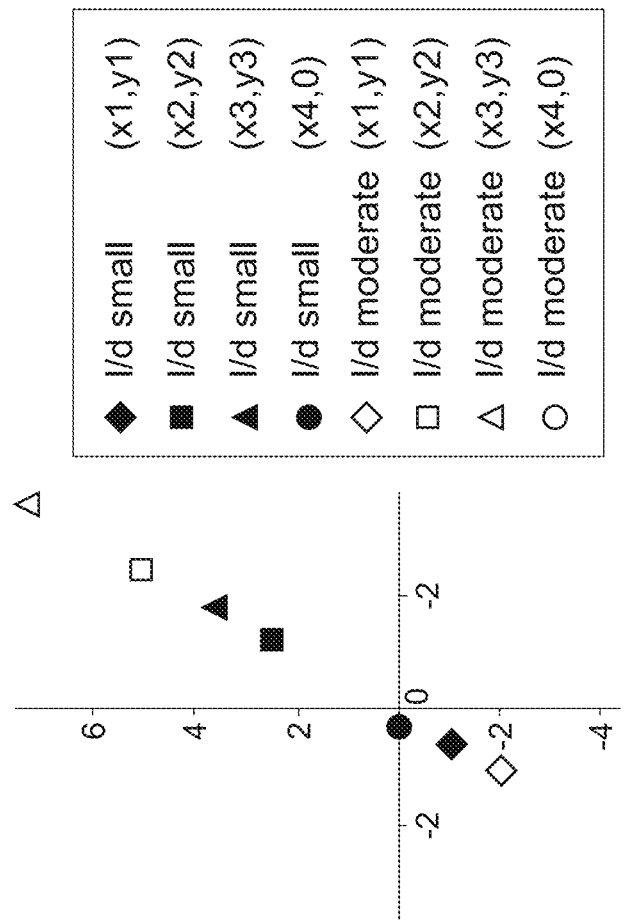
Figure 14:
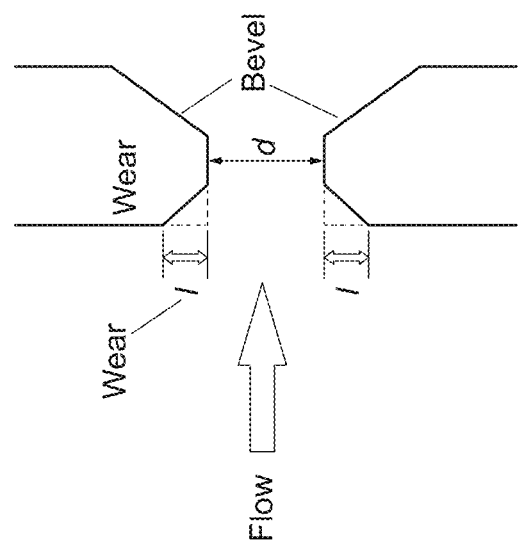

FIG. 14. Modelling Orifice Plate Edge Wear and Sample DP Meter Diagnostic Suite Data.

Figure 15:
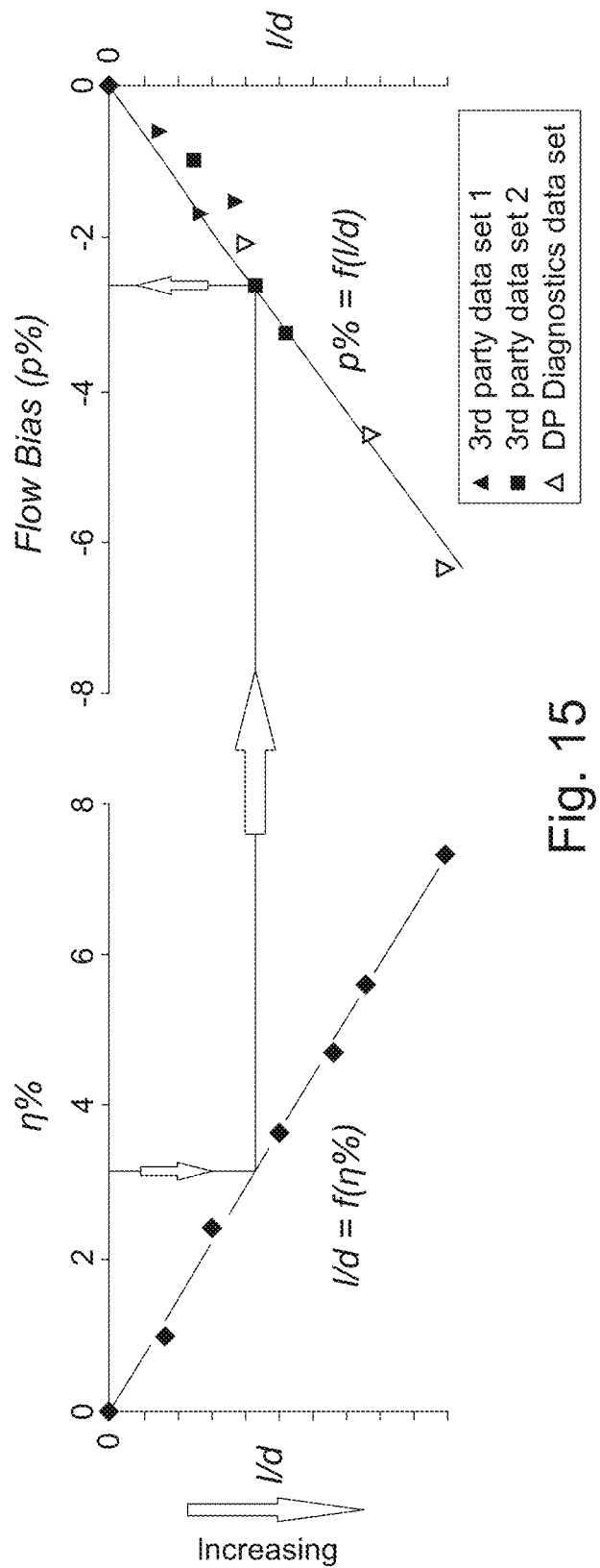

FIG. 15. DP Meter Objective Diagnostic vs. Amount of Edge Wear vs. Flow Prediction Bias.

Figure 16:
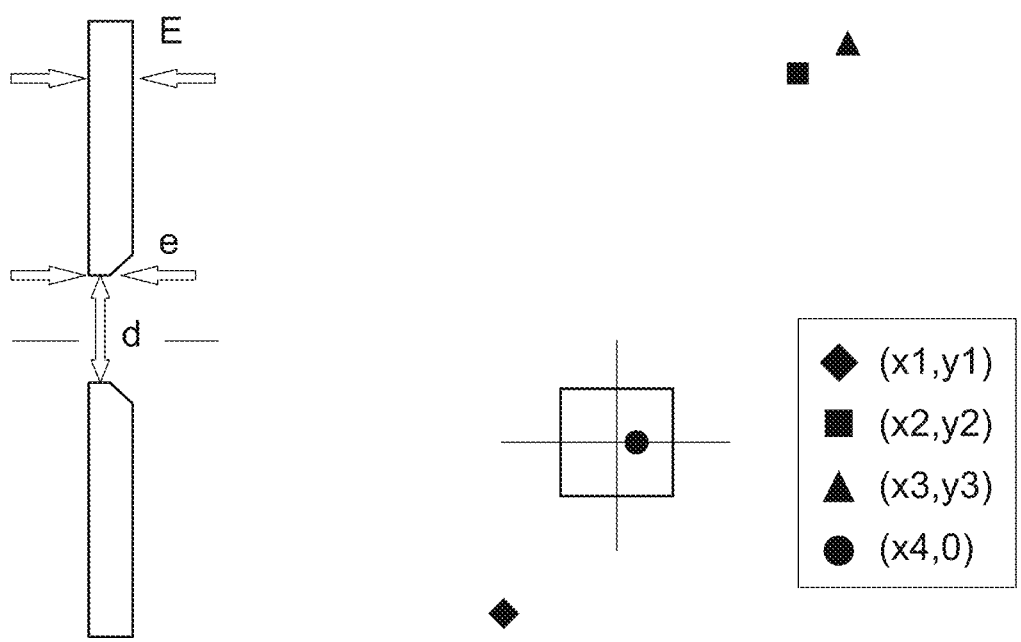

FIG. 16. Sketch of Orifice Plate and DP Meter Diagnostic Suite Display Showing Reversed Plate Pattern.

Figure 17:
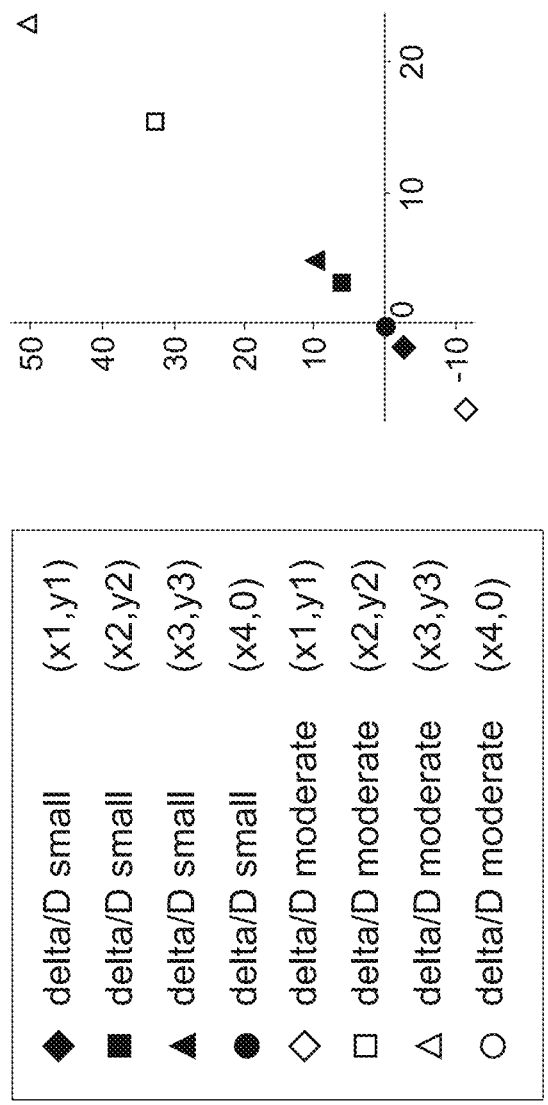

FIG. 17. Sketch of Buckled Plate and DP Meter Diagnostic Suite Display Showing Buckled Plate Pattern.

Figure 18:
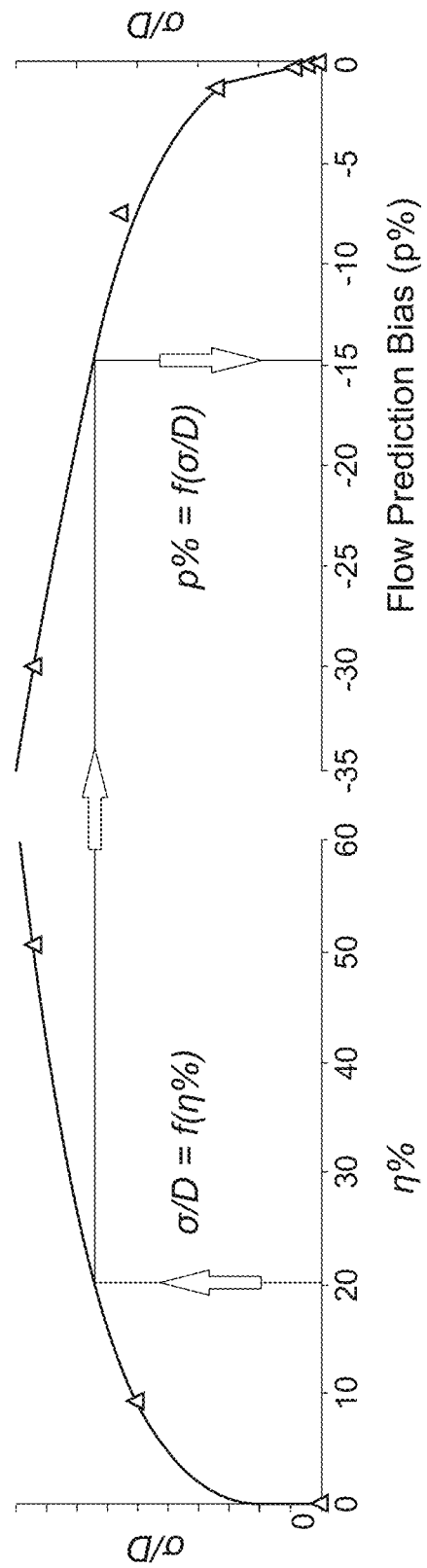

FIG. 18. Buckled Plate σ/D parameter vs. Objective Diagnostic Parameter vs. Flow Prediction Bias.

DETAILED DESCRIPTION

1. Introduction

Flow meter users want to know from a flow meter's diagnostic suite if 1) it will indicate when something is wrong? If so, 2) will it say what is wrong? If so, it would also be useful to ask 3) will it tell the operator the associated flow prediction bias? For state of the art flow meter diagnostic suites the answers are:

1) The diagnostic suite needs to have at least one diagnostic check that is sensitive to the specific problem, and the problem will have to be significant enough to cross that diagnostics sensitivity threshold. But yes, modern diagnostic suites will indicate a problem exists for most common malfunctions.

2) A modern flow meter diagnostic suite produces multiple individual diagnostic check results. Collating them produces an output diagnostic pattern. Therefore abnormal pattern recognition techniques can be used to match common malfunctions to particular diagnostic patterns. However, the state of the art of such pattern recognition is rudimentary. Many flow meter diagnostic results are rather ambiguous. The cutting edge of flow meter diagnostic technology is hand crafted (i.e. not artificial intelligence learned) heuristic diagnostic pattern recognition. A few specific abnormal diagnostic patterns may be associated with particular common type of malfunctions. However, for flow meter designs exposed to various malfunctions the diagnostic suites only display the patterns, the diagnostic software or product manual does not engage in pattern recognition. It is for the end user, or consultants, to manually decipher what any given diagnostic pattern means. A notable exception to this is the Differential Pressure (DP) meter diagnostic system 'Prognosis™', which is discussed in U.S. Pat. No. 8,136,414. Said patent is herein incorporated by reference in its entirety. Here, the commercial Prognosis™ software that uses this cited technology shows a diagnostic display where many abnormal diagnostic patterns are automatically accompanied by a list of possible malfunctions in order of their probability. that uses this cited technology shows a diagnostic display where many abnormal diagnostic patterns are automatically accompanied by a list of possible malfunctions in order of their probability.

3) As identifying a particular malfunction with any flow meter's state of the art diagnostic suite is so challenging, it is not known how to predict the associated flow prediction biases for each common malfunction. However, the commercial Prognosis™ software routinely offers the DP meter operator guidance on the meaning of several abnormal diagnostic patterns. Depending on the specific pattern this may be a specific malfunction, or for other patterns a short list of possible malfunctions presented in the order of their probability. The DP meter diagnostic suite is therefore one of, if not the most, advanced of the flow meter diagnostic suites.

Multiple diagnostic outputs produce multiple numerical results. These results can be inter-compared to show a numerical pattern in the data set. Pattern recognition is the automated recognition of such patterns and regularities, such that specific patterns are indicative of specific causes.

The present state of the art flow meter diagnostic suites can usually state when there is some problem. Sometimes they can state what the particular problem is, and other times they short list possible problems—i.e. the diagnostic pattern is communal to all meter malfunctions on that short list. But, presently no flow meter diagnostic suite for any flow meter design can also predict the associated flow prediction biases induced by particular malfunctions.

It is now disclosed that in most common malfunction cases it is possible to use a diagnostic suite to also derive the associated flow prediction bias.

The inventor has created and discloses herein a comprehensive DP meter diagnostic system. For the majority of common DP meter malfunctions this system can not only identify when something is wrong, and either state specifically what is wrong, or short list the few options of what is wrong, but can now also offer associated flow prediction biases.

To achieve this, the inventor has realized that a technology does not need to work perfectly all of the time to be of considerable practical use most of the time. There are an infinite amount of malfunction types, severity of those malfunctions, and combinations of these malfunctions, which makes it unrealistic to expect a diagnostic system to be able to identify every malfunction and its induced flow prediction bias every time under any and all circumstances. However, the inventor has realized nonetheless that a practical system can be developed to offer flow prediction biases.

This is of significant importance. When a flow meter produces a diagnostic warning, if the system can tell the user what the problem or likely problem is, and assign a reasonably accurate prediction of the associated flow prediction bias/es, then the user is significantly better informed. The user can approximate the correct flowrate while the meter has some types of identified malfunctions. The user can make better informed decisions about maintenance requirements. Such information can help with audits, and 'lost and unaccounted for' product investigations, thereby helping help resolve buyer/seller metering disputes. Such a system's inherent general usefulness is self-evident. This text will now disclose the DP meter methodology that produces such a system.

2. The Nature of Flow Meter Diagnostic Suite Constituent Parts

In order to learn more from flow meter diagnostics it is first necessary to learn more about flow meter diagnostics. Before reviewing and developing the DP meter diagnostic suite (based on U.S. Pat. No. 8,136,414) it is first beneficial to consider some fundamental facts regarding the nature of diagnostic checks.

The physicist Lord Kelvin stated: "When you can measure what you are speaking about, and express it in numbers, you know something about it, when you cannot express it in numbers, your knowledge is of a meager and unsatisfactory kind; it may be the beginning of knowledge, but you have scarcely, in your thoughts advanced to the stage of science."

That insight has consequences to flow meter diagnostics. Flow meter diagnostic results tend to be treated as qualitative subjective information, not quantitative objective information. Nevertheless, in reality most flow meter diagnostic suites contain an assortment of subjective and objective diagnostic checks.

An objective diagnostic check can be defined as where the diagnostic result is derived from comparison with physical law, and not just comparison with intuition, opinion, or some general rule of thumb set by experience. It compares a measureable diagnostic value to a baseline fixed by physical law, thereby creating a quantitative objective numerical result. You "measure what you are speaking about, and express it in numbers, you know something about it". It is a clear and precise diagnostic statement. Objective diagnostic checks are useful for measuring absolute changes and monitoring relative changes in a system's performance.

A subjective diagnostic check can be defined as where the diagnostic result is not derived from comparison with physical law, but rather comparison with intuition, opinion, or some general rule of thumb set by experience. It compares a measureable diagnostic value to an arbitrary variable baseline. With a changeable/debatable baseline such diagnostic results are not truly expressible by meaningful numbers. The ambiguous nature of this baseline produces a qualitative subjective result. Such subjective results are perhaps "the beginning of knowledge", and hence valuable, but all the same, the knowledge is of a more meager kind. It is an ambiguous and imprecise diagnostic statement. Subjective diagnostic checks are therefore really only useful for monitoring relative changes in instrument performance.

Hence, objective diagnostic checks tend to be more powerful, i.e. more useful, than subjective diagnostic checks. That is, not all diagnostic checks are created equal. Some inherently contain more useful information than others. That is not to say that subjective diagnostic checks do not have their place. They certainly do. A subjective diagnostic check is far better than no diagnostic check, and an objective check coupled with a subjective check is more useful than an objective check alone. The more distinct separate pieces of information a diagnostic suite contains, the more unique the corresponding diagnostic pattern for each malfunction, and the more conducive to successful pattern recognition it is.

However, once a malfunction has been identified by such a diagnostic pattern, in order to make a defensible accurate prediction of the corresponding meter flow bias you must use objective diagnostics. With objective diagnostics offering a quantifiable absolute precise measurement, they offer a portal to calculating an associated precise flow prediction bias. Subjective diagnostics offer only relative vague results, and hence there is no way to use them to make precise numerical predictions. Hence, for a flow meter diagnostic suite to be successfully developed such that it can state flow prediction biases for malfunctions it identifies, it will need to use the quantitative objective results produced from objective diagnostics as the tools.

It is now pertinent to state that it isn't possible to directly jump from stating a malfunction type to predicting an associated flow prediction bias. An intermediate step is required. That is, in order to predict the associated flow prediction bias it isn't good enough to just identify the type of malfunction, you have to also quantify the magnitude of that malfunction. This is the intermediate step and it is no trivial matter. In fact, this step is the most difficult in the whole process. Once the diagnostic system has identified the meter has some problem, and then predicted what the source of the malfunction is, it must then be able to accurately estimate the magnitude of the problem, i.e. express it in a quantifiable/measureable way. Only when the magnitude of the malfunction is expressible in numbers are you in a position to then make quantifiable predictions about its effects. If and when the difficult task of quantifying the precise magnitude of a specific malfunction is achieved, then the follow on task of quantifying the associated flow prediction bias can be achieved.

Finally, before reviewing the existing DP meter diagnostics system ('Prognosis™'/U.S. Pat. No. 8,136,414) and then developing it, it is necessary to make two comments regarding objective diagnostic checks:

The first comment is that in practice no diagnostic check is truly objective. All measured parameter values include instrumentation reading uncertainties. These instrument uncertainties are subjective. Hence, even objective diagnostic checks have an element of subjectivity. Nevertheless, in practice this is not problematic. The influence on the theoretical objective results of the instrument uncertainties is small, and usually trivial. There is still clearly two sets of diagnostic checks, i.e. objective tests based on the theory of physical law, and subjective tests that are not.

The second comment is calibrated parameter values known to be reproducible from calibration laboratory to field applications can be used to create objective diagnostic checks. This is the application of a key axiom in science, paraphrased here as: 'Whatever is true of everything we've seen here and now is true of everything everywhere in the future'. If the same flow meter remains unchanged and the installation between the calibration and field application is the same, the meter's performance across the same calibration and field flow conditions should remain unchanged. Such calibration values are therefore valid baselines, and any measured change in performance is therefore an objective result. However, this is only true of reproducible calibration results. Due to inevitable various subtle installation and flow condition differences not all calibrated parameters are reproducible in the field. Only calibration parameters that are truly transferable to the field can be used for objective diagnostics.

Let us now review the DP meter diagnostic suite before applying these principles to the task of quantifying the magnitude of malfunctions, and thereby estimating the flow meter's associated flow prediction bias.

3. Review of Prior Art Generic DP Meter Diagnostic System

FIGS. 1, 2, & 3 show sketches of Venturi, orifice, and cone DP meters with instrumentation respectively, each with a simplified sketch of the pressure field produced through the meter body. These are three examples of generic DP meters. The same diagnostic system, and the same advance to this diagnostic system described in this text, can be applied to all such generic DP meters, e.g. nozzle, Venturi nozzle, wedge meters etc.

These traditional DP meters all operate on the same physical principle. They read the inlet pressure ($P_1$), and the differential pressure ($DP_t$ also labelled as $\Delta P_t$) between the inlet pressure tap (1) and a pressure tap (t) in the vicinity of the primary element. The primary element is the geometric obstruction, i.e. the Venturi constriction, or the orifice plate, or the cone element etc. Due to the physical laws of conservation of mass and energy the flow moves past this obstruction at a higher local velocity and a lower local pressure ($P_t$) than at the meter inlet. The resulting differential pressure ($\Delta P_t = P_1 - P_t$) is the single primary signal a traditional DP meter uses to predict the flowrate. That is, whereas all generic DP meters produce a pressure field along the entire meter body, traditionally only a single DP is measured between the inlet and the primary element. The huge amount of extra information contained in the pressure field as a whole was traditionally ignored. Steven developed the principle (described in U.S. Pat. No. 8,136,414) of the entire pressure field holding significantly more information about the flow rate and meter performance than the single traditional DP measurement.

The DP meters in FIGS. 1 thru 3 have been given a third pressure tap (d) downstream of the primary element. This addition to the traditional DP meter design allows the measurement of two extra DP's, i.e. the DP between the downstream (d) and the low (t) pressure taps, i.e. the "recovered" DP, $\Delta P_r$, and the DP between the inlet (1) and the downstream (d) pressure taps, i.e. the permanent pressure loss, $\Delta P_{PPL}$ or "PPL". This offers an increased understanding of the pressure field throughout the entire meter body.

$$\Delta P_t = \Delta P_r + \Delta P_{PPL} \tag{1}$$

Any one of these three DPs can be inferred from the other two. The sum of the recovered and PPL DPs gives an inferred traditional DP ($\Delta P_{t,inf}$). This inferred traditional DP must equal the read traditional differential pressure (equation 1). However, there are naturally uncertainties to each DP reading, and the overall difference of the read and inferred DPs has an uncertainty designation of $\vartheta$ %. The percentage difference in the inferred and read traditional DP is denoted as $\vartheta\%$ (see equation 2)

$$\delta\% = (\Delta P_{t,inf} - \Delta P_t)/\Delta P_t)*100\% \tag{2}$$

This is an objective diagnostic check based on a known physical reality, and not just intuition, opinion, or some general rule of thumb set by experience.

$$\text{Traditional Flow Equation: } m_t = \frac{A\beta^2}{\sqrt{1-\beta^4}}\varepsilon C_d \sqrt{2\rho\Delta P_t}, \tag{3}$$

uncertainty± $x\%$ $$\text{Expansion Flow Equation: } m_r = \frac{A\beta^2}{\sqrt{1-\beta^4}}K_r\sqrt{2\rho\Delta P_r}, \tag{4}$$

uncertainty± $y\%$ $$\text{PPL Flow Equation: } m_{ppl} = AK_{PPL}\sqrt{2\rho\Delta P_{PPL}}, \tag{5}$$

uncertainty± $z\%$

Traditionally, there is a single DP meter flow rate calculation, i.e. equation 3. However, with the additional downstream pressure tap three flow equations can be produced. That is, the recovered DP and PPL can also be used to find the flow rate with an "expansion" flow equation (see equation 4) and a "PPL" flow equation (see equation 5) respectively. Note that $m_t$, $m_r$, and $m_{PPL}$ represents the traditional, expansion and PPL mass flow rate equation predictions of the actual mass flow rate m respectively. The symbol $\rho$ represents the inlet fluid density. Symbols A and $\beta$ represent the inlet area and the beta respectively. Beta is a geometric constant for a given DP meter, and is calculated by equation 6, $$\beta = \sqrt{(A_t/A)} \tag{6}$$

where $A_t$ denotes the 'throat' area, i.e. the minimum cross sectional area through the DP meter's primary element. For compressible gas flows the change in local pressure through the meter induces a change in local gas density, and the expansion factor (denoted a 'ε') accounts for this. Liquids have an expansion factor of unity.

The terms $C_d$, $K_r$, and $K_{PPL}$ represent the discharge coefficient, the expansion coefficient and the PPL coefficient respectively. The discharge coefficient is usually found by calibrating the DP meter, and hence, the expansion and PPL coefficients can also be found during the same calibration. These three calibration found flow coefficients are either for simplicity set as constants, or for more precision data fitted as functions of the non-dimensional flow rate parameter 'Reynolds number' (Re). Equation 7 shows the Reynolds number calculation, where μ is the fluid viscosity, and D is the meter inlet diameter.

$$Re = 4m/\Pi\mu D \qquad (7)$$

Therefore, every DP meter body with a downstream pressure tap is in effect three flow meters. All three flow coefficients are transferable from the calibration laboratory to the field application. Hence, these calibrated meter parameters can be used to produce objective diagnostic tests. Furthermore, the physical law of conservation of mass dictates that the three flow rate predictions of the same flow through the same meter body must be the same. Hence, the inter-comparison of any two of the three mass flow rate predictions is an objective diagnostic check. There are three pairs of flow rate predictions, hence three objective diagnostic checks. Equations 8, 9, and 10 show the respective pairs flow rate comparison. However, of course the calibration data introduce some uncertainty. Let us introduce the uncertainty as say x %, y % & z % for the traditional, expansion, and PPL meters respectively. A correctly operating meter will have no difference between any two flow equations greater than (by convention) the root sum square of the two uncertainties. The maximum allowable difference between any two flow rate equations, i.e. φ%, ξ%, and ν% as shown in equation set 11 thru 13.

$$\text{Traditional to PPL Meter Comparison: } \psi\% = [(m_{PPL} - m_t)/m_t]*100\% \qquad (8)$$

$$\text{Traditional to Expansion Meter Comparison: } \lambda\% = [(m_r - m_t)/m_t]*100\% \qquad (9)$$

$$\text{PPL to Expansion Meter Comparison: } X\% = [(m_r - m_{PPL})/m_{PPL}]*100\% \qquad (10)$$

$$\text{Traditional \& PPL Meters \% allowable difference } (\phi\%): \phi\% = \sqrt{((x\%^2) + (z\%^2))} \qquad (11)$$

$$\text{Traditional \& Expansion Meters \% allowable difference}(\xi\%): \xi\% = \sqrt{((x\%^2) + (y\%^2))} \qquad (12)$$

$$\text{Expansion \& PPL Meters \% allowable difference } (\nu\%): \nu\% = \sqrt{((y\%^2) + (z\%^2))} \qquad (13)$$

This diagnostic methodology uses the three individual DP's to independently predict the flow rate and then compares these results. In effect, the individual DP's are therefore being directly compared. However, it is possible to take a different diagnostic approach.

Equation 1 can be re-written as equation 1a. The Pressure Loss Ratio, 'PLR', is the ratio of the PPL and traditional DPs (i.e. PLR=$\Delta P_t / \Delta P_t$). Hence, for any given PLR there are corresponding Pressure Recovery Ratio (PRR=$\Delta P_r / \Delta P_t$), and Recovered to PPL DP Ratio (RPR=$\Delta P_r / \Delta P_{PPL}$) values. The PLR, and hence the PRR and RPR, are characteristics of any given DP meter, and are found by the same calibration that found $C_d$, $K_r$, and $K_{PPL}$. The calibration produces PLR, PRR, and RPR predictions with uncertainties a %, b %, and c % respectively.

$$(\Delta P_r/\Delta P_t) + (\Delta P_{PPL}/\Delta P_t) = PLR + PRR = 1 \qquad (1a)$$

$$\text{PLR check: } \alpha\% = [(PLR_{read} - PLR_{cal})/PLR_{cal}]*100\% \qquad (14)$$

$$\text{PRR check: } \gamma\% = [(PRR_{read} - PRR_{cal})/PPRR_{cal}]*100\% \qquad (15)$$

$$\text{RPR check: } \eta\% = [(RPR_{read} - RPR_{cal})/RPR_{cal}]*100\% \qquad (16)$$

All three DP ratios are transferable from the calibration laboratory to the field application. Hence, these calibrated meter parameters can be used to produce objective diagnostics.

The DP meter diagnostic display is conducive for hand crafted heuristic diagnostic pattern recognition. The seven diagnostic checks can be denoted as four points on a graph.

For the $DP_t$ and $DP_{PPL}$ pair: $x_1 = \psi\%/\phi\%$ and $y_1 = \alpha\%/a\%$
For the $DP_t$ and $DP_r$ pair: $x_2 = \lambda\%/\xi\%$ and $y_2 = \gamma\%/b\%$
For the $DP_{PPL}$ and $DP_r$ pair: $x_3 = X\%/\nu\%$ and $y_3 = \eta\%/c\%$
For the $DP_t$ and $DP_{t,inf}$ pair $x_4 = \delta\%/\vartheta\%$ and $y_4 = 0\%$ Each of the seven diagnostic checks has normalized data, i.e. each diagnostic parameter percentage difference output is divided by the allowable percentage difference for that parameter. Table 1 shows the individual objective diagnostic check results within the suite that would or would not create an alarm.

TABLE 1

The DP Meter Prognosis Diagnostic Results.

| DP Pair | No Warning | WARNING | No Warning | WARNING |
|---|---|---|---|---|
| $\Delta P_t$ & $\Delta P_{PPL}$ | $-1 \leq x_1 \leq +1$ | $-1 > x_1$ or $x_1 > +1$ | $-1 \leq y_1 \leq +1$ | $-1 > y_1$ or $y_1 > +1$ |
| $\Delta P_t$ & $\Delta P_r$ | $-1 \leq x_2 \leq +1$ | $-1 > x_2$ or $x_2 > +1$ | $-1 \leq y_2 \leq +1$ | $-1 > y_2$ or $y_2 > +1$ |
| $\Delta P_{PPL}$ & $\Delta P_r$ | $-1 \leq x_3 \leq +1$ | $-1 > x_3$ or $x_3 > +1$ | $-1 \leq y_3 \leq +1$ | $-1 > y_3$ or $y_3 > +1$ |
| $\Delta P_{t, read}$ & $\Delta P_{t, inf}$ | $-1 \leq x_4 \leq +1$ | $-1 > x_4$ or $x_4 > +1$ | N/A | N/A |

FIG. 4 shows the standard DP meter diagnostic suite (Prognosis™) display. The normalized data is plotted together with a normalized diagnostic box (NDB) 400 which provides a clear boundary for indicating whether a diagnostic parameter is within or outside of acceptable threshold values. Considering Table 1, with all seven diagnostic coordinates within the normalized diagnostic box ('NDB') no meter malfunction is found, but with one or more diagnostic coordinate outside the NDB the verification system shows a warning. Furthermore, when a warning is shown, i.e. one or more point/s are outside the NDB, the position of all points regardless of whether they are inside or outside the NDB, i.e. the 'diagnostic pattern', gives information to what the source of the problem is. As we will see in examples, this diagnostic pattern recognition can identify a specific malfunction, or at least give a short list of possible malfunctions. FIG. 4 shows the actual display used in industry, but in terms of this invention, it is understood that alternative methods of displaying or organizing the data will produce different but equivalent pattern recognition techniques. Different displays are still using the same concepts.

The Orifice Meter Special Case

Although the orifice meter is a generic DP meter, unlike most other DP meters it is usually not calibrated. The reason is over the decades of its use throughout industry, with massed repeated calibrations, industry came to realize as long as it was manufactured within the tight tolerances stated in the industry standards (e.g. ISO 5167-2, 2003) the orifice meter performance is very reproducible. Hence, orifice meters are typically not calibrated. Instead orifice meters are manufactured to strict dimensional tolerances stipulated by the standards, and these standards state the discharge coefficient. ISO 5167-2 offers a discharge coefficient prediction that is a function of the orifice meter beta (β) and the Reynolds number (Re), see equation 17:

$$\text{ISO 5167-2: } C_d = f(\beta, Re) \pm 0.5\% \tag{17}$$

With no calibration this means the diagnostic system requires the other five diagnostic parameters (i.e. $K_r$, $K_{PPL}$, PLR, PRR, and RPR) found from another source. However, ISO 5167-2 also gives a theoretical expression for PLR. This ISO PLR expression is not shown to facilitate diagnostic capabilities, but to allow the meter user to predict the PPL produced by the meter on the pipe system. Nevertheless, the expression gives an ISO baseline PLR prediction ('PLRbase' for an uncalibrated orifice meter. This ISO PLR prediction shows the PLR as a function of discharge coefficient $C_d$ and beta β, see equation 18.

$$\text{ISO PLR}_{base} = f(C_d, \beta) \tag{18}$$

However, this theoretical expression is now known to have a slight bias at β>0.55, and hence there are now alternative PLR data fits. It is now known that the $C_d$ has a second order effect on the PLR. In practice the orifice meter PLR can be described by a data fit as a function of β alone, i.e. see equation 19. This relationship is used to predict the reference base line PLR for a given beta β.

$$PLR = f(\beta) \tag{19}$$

Hence, with the ISO 5167-2 orifice meter discharge coefficient prediction (equation 18) coupled with an orifice meter PLR baseline prediction (equation 19) the four remaining diagnostic parameters, i.e. the PRR, the RPR, the expansion coefficient ($K_r$), and the PPL coefficient ($K_{PPL}$) are derivable, see equations 20, 21, 22, and 23 respectively. Hence, the diagnostic system is applicable to uncalibrated orifice meters.

$$PRR_{base} = 1 - PLR_{base} \tag{20}$$

$$RPR_{base} = (1 - PLR_{base})/PLR_{base} \tag{21}$$

$$K_r = (\varepsilon C_d)/\sqrt{(1 - PLR_{base})} \tag{22}$$

$$K_{PPL} = (\beta^2/\sqrt{(1-\beta^4)}) \cdot ((\varepsilon C_d)/\sqrt{(PLR_{base})}) \tag{23}$$

Finally, there is an $8^{th}$ DP meter diagnostic check. This check is subjective. The $8^{th}$ diagnostic check is the monitoring of the DP meter signal and corresponding diagnostic parameter stability, i.e. the application of statistical methods on these outputs. This is described in patent application U.S. Ser. No. 14/889,010 (published as US 2016/0084687) which is hereby incorporated by reference in its entirety. The fluctuation of the primary signals is not predictable by any physical law and the calibration data is not transferable from calibration laboratory to the field. The installation, and the secondary flow conditions (e.g. flow pulsation from compressors, light pipe vibration, disturbance from upstream components etc.) can shift these values in an unpredictable way. Hence, this is a subjective diagnostic useful specifically for trending only—i.e. monitoring shifts of this value from an in service meter over time. As such it is not including in the DP meter output display (see FIG. 4) but it is accounted for in the background pattern recognition capabilities.

For example, there is a specific pattern produced on FIG. 4's plot by average data that is communal to four common malfunctions, i.e. wet gas/blocked impulse line/partially blocked primary element conduit/erroneous geometry. However, the additional of this 8th subjective diagnostic check allows the system to separate out the wet gas and blocked impulse line options from the partially blocked primary element conduit and erroneous geometry options. That is, the addition of the subjective diagnostic halves the possible malfunction list from four to two. Low instability implies a partially blocked primary element conduit or an erroneous geometry. High instability implies wet gas flow or a blocked impulse line, with follow on period and amplitude analysis in this subjective diagnostic identifying which of these two problems it is (see application U.S. Ser. No. 14/889,010). Therefore, using only the seven objective diagnostic checks gives a diagnostic pattern that is communal to four different possibilities, whereas the addition of the one subjective diagnostic increases the pattern recognition capability significantly. So subjective diagnostics do give useful qualitative information with regards to suggesting something has changed, something may be wrong, and combining them with objective diagnostics gives clearer pattern recognition. However, subjective diagnostics cannot help quantify a malfunction once it is identified, i.e. they cannot give a measureable prediction of the magnitude of a problem. Once a combination of objective and subjective diagnostics produce a diagnostic pattern that indicates the specific problem, or group of possible problems, to then go on and estimate the flow prediction bias you can only use the objective diagnostic results.

A flow meter having eight diagnostic checks where seven are objective diagnostic checks (see Table 2) is unusual. Other flow meter designs tend to have more of an objective/subjective mixture in their respective diagnostic suites. Hence, the DP meter is now identified as being remarkably well positioned to be developed into a system that cannot just identify if it has a problem, and state what that problem is, but now go on to quantify the magnitude of that problem, and predict the associated flow prediction bias.

TABLE 2

List of DP Meter Diagnostic Checks and the Objective/Subjective Designation.

| Diagnostic Check | Diagnostic Type |
| --- | --- |
| PPL to Traditional Mass Flow Comparison ($x_1$) | objective |
| Recovered to Traditional Mass Flow Comparison ($x_2$) | objective |
| Recovered to PPL Mass Flow Comparison ($x_3$) | objective |
| PLR Shift from Calibrated Baseline ($y_1$) | objective |
| PRR Shift from Calibrated Baseline ($y_2$) | objective |
| RPR Shift from Calibrated Baseline ($y_3$) | objective |
| DP Summation Integrity Check ($x_4$) | objective |
| DP Reading and DP Ratio Standard Deviation Shifts | subjective |

4. A System to Quantify a Flow Prediction Bias of a Malfunctioning Flow Meter

FIG. 5 illustrates a system 500 according to the disclosure which can quantify a flow prediction bias of a malfunctioning flow meter. The system includes a flow meter 502 and a flow analyzer 508 which includes a diagnostics suite 504 and a bias prediction module 506.

The flow meter 502 may be any kind of flow meter for metering fluid flow. When in situ it is provided at or within a fluid flow conduit and provides sensors or other apparatus for taking physical measurements which represent the fluid flow rate. A fluid flow rate could be a mass flow rate or a volume flow rate depending on the type of meter being used.

The flow meter 502 interfaces with the flow analyzer 508 via appropriate ports, tappings hydraulic, wireless or other connections. The flow analyzer 508 comprises analogue to digital conversion circuitry together with logic circuitry that receives the input readings from the sensors of the flow meter and converts these to digital signals which can then be operated on by logic or other dedicated circuitry to carry out the methods and operations described herein.

The flow analyzer 508 may comprise a general-purpose computer that is customised with a special program that includes instructions for carrying out the operations of the disclosure as mentioned herein. It may also take the form of a flow computer which is a specialised and/or ruggedised version of a general-purpose computer.

The diagnostics suite 504 and the flow bias prediction module 506 maybe part of the same package or maybe provided separately. Furthermore, components of the flow analyzer 508 maybe provided locally, remotely or combinations thereof. Any appropriate cloud or industrial internet of things (IIoT) infrastructure can be implemented.

Furthermore, instead of a general-purpose computer the flow analyzer 508 could include an ASIC, FPGA or other customized circuitry which is designed explicitly for performing the dedicated functions described herein.

Presently if a malfunction is identified, there are only two practical uses for such information.

The first use is to educate the users on the importance of not running the meter in this condition, that is, simply to avoid the problem. The second is to take the meter off line and perform tests to determine a flow prediction bias.

Existing methods for estimating a DP meter's flow prediction bias are completely reliant on the magnitude of the problem being known from a source external to the meter. Presently the DP meter verification system/diagnostic suite is only used to alert the end user to the existence of a problem, and via diagnostic suite pattern recognition to advise what the type of problem is. The present state of the art DP meter diagnostic suite does not and cannot then tell the end user the magnitude of the problem. Using an orifice meter as a generic example, if the type of problem is a buckled orifice plate, how buckled is the plate? If the type of problem is a worn orifice edge, just how worn is the edge? If the type of problem is erroneous geometry keypad entries to a flow computer, just how erroneous are these entries? If the gas is wet, just how wet is the gas? Without the ability to quantify the magnitude of the problem the present DP meter diagnostic suite cannot then predict the associated flow prediction bias.

This is not at all ideal. Industry would benefit from a flow meter diagnostic system that could not only show something is wrong, and then state what specifically is wrong, and then also make a quantifiable prediction regarding the magnitude of that specific malfunction, and hence be able to automatically predict the associated flow prediction bias in real time, without the need to take the meter off line.

The present disclosure takes the existing DP meter diagnostic suite's outputs, and the corresponding pattern recognition capability to identify the type of problem, and then relates the objective diagnostics measurements within that diagnostic suite to the magnitude of the problem. With the DP meter diagnostic suite then predicting the type and magnitude of the problem, then the diagnostic suite can go on to complete the calculation of the associated flow prediction bias.

Once a specific problem or short list of a few possible problems is created then one or more objective diagnostic check/s are selected to quantify the magnitude of that problem. FIG. 6 shows a generic description of how a DP meter diagnostic suite would achieve such a task. For each common malfunction a graduating scale of a specific problem magnitude vs. the associated induced flow rate prediction bias is required. Then, from either direct calculation, or by using a data fit or look up table, the appropriate objective diagnostic parameter is related to the magnitude/quantity of that problem (i.e. see left hand side of FIG. 6). Once this critical step has been achieved the magnitude of that malfunction can then be related to an associated flow prediction bias (see right hand side of FIG. 6).

The concept of making a flow meter that can 'look at itself' and tell you if it has a problem, and what type of problem it is, and then the magnitude of that problem, and then what the associated flow prediction bias is, would be regarded by many, if not most engineers as fanciful nonsense, 'a grand chimera'. This common view is based on the flawed understanding that there is no way to get from a general diagnostic alarm to a precise quantifiable flow prediction result. This view goes hand in hand with the earlier comment that most in industry assume all diagnostic results to be subjective qualitative information. Most have not begun to even try to achieve this, either because it hasn't occurred to them to try, or because they don't know where to begin. It superficially may look like a miracle is required to make the jump from general diagnostic result to a quantifiable flow prediction bias estimation, and any claims otherwise are smoke and mirrors. However, the reality is very different.

To achieve this aim, the inventor has understood that:
1) the system doesn't have to work perfectly all the time to be very useful most of the time,
2) there are two distinct types of diagnostic checks, i.e. objective and subjective checks, and together they give excellent diagnostic pattern recognition capabilities,
3) these objective checks hold large amount of unnoticed useful information,
4) the task at hand is not to directly try and predict the flow bias, but rather to use an intermediate step of predicting the magnitude of an identified type of problem.

Once this intermediate step is achieved the follow on estimation of an associated flow prediction bias can be achieved. FIG. 7 shows the sequence of calculations required to achieve the goal. First, a diagnostic suite indicates unspecified problem (step 700). The diagnostic suite then uses complete package of objective and subjective diagnostics to identify specific problem via pattern recognition (step 702).

Thereafter, objective diagnostic measurements are related to that identified malfunction to predict the corresponding magnitude of that malfunction (step 704). Then, the magnitude of known malfunction is used to predict the corresponding flow prediction bias (step 706). This means that flow bias predictions are applicable in real time within the meter, while it is in situ and in active use.

The following worked examples help explain the concept.

In the interest of space the orifice meter has been selected for the worked examples. It will be apparent to an individual skilled in the art that the same methodology is equally applicable to any generic DP meter, e.g. Venturi, nozzle, wedge, cone DP meters etc.; and to other types of flow meter including without limitation Coriolis meters and ultrasonic flow meters.

5. Worked Examples

The following worked examples are based on real data sets obtained from use of the DP meter verification system Prognosis' (based on U.S. Pat. No. 8,136,414) in the field or under test at laboratories. The calculation of the magnitude of the malfunction and corresponding estimation of flow prediction bias are disclosed here for the first time.

5.1 Erroneous DP Readings

DP meter diagnostic system data was logged from a fully serviceable 10", 0.46β, orifice meter. The resulting diagnostic display showing correct meter performance is shown on the left side of FIG. 8. In order to test the diagnostic suite the meter user introduced a slight leak in the DP transmitter's 5 way manifold. The right hand side of FIG. 8 shows the diagnostic pattern result when the traditional DP was thereby mis-read. The resulting read DPs were $\Delta P_t=61.1$"WC, $\Delta P_r=14.6$"WC, $\Delta P_{PPL}=50.0$"WC, i.e. $P_{t,inf}=64.6$"WC. The difference between the read and inferred traditional DP is 5.7% so for the normal DP uncertainty setting of 1θ=1% the DP meter diagnostic suite $(x_4, y_4)$ of (5.76,0) correctly shows a DP reading issue.

Furthermore, the other six objective diagnostic checks react in a specific way. The points $(x_1, y_1)$ and $(x_2, y_2)$ both move outside the NDB while the single point $(x_3, y_3)$ remains inside the NDB. The pattern indicates specifically what is wrong. The x4 check is the objective DP integrity check. That is a DP reading is confirmed to be erroneous. Point $(x_3, y_3)$ used the recovered and PPL DPs and it shows no problem, while points $(x_1, y_1)$ and $(x_2, y_2)$ have a communal DP transmitter, the traditional DP transmitter. Hence pattern recognition shows 1) something is wrong, and then 2) it is specifically a DP transmitter problem, and 3) it is specifically the traditional DP reading that is erroneous. This shows something is wrong, and then suggests specifically what is wrong.

Now select objective diagnostic x4 which is based on the physical relationship of the three DPs as described by equation 1. The diagnostic pattern showed that $\Delta P_r$ and $\Delta P_{PPL}$ are trustworthy. Hence this objective diagnostic gives the inferred $\Delta P_{t,inf}=64.6$"WC which we can compare to the directly read (and known to be erroneous) $\Delta P_t=61.1$"WC. Thus, the objective diagnostic tells us that the direct $\Delta P_t$ reading has a −5.4% bias. Equation 24 shows the associated gas flow prediction bias calculation, shown to be −2.7% by equation 24a. FIG. 9 shows the relationship between the objective diagnostic 'x4' vs. Malfunction Quantity vs. Flow Prediction Bias.

$$\% \text{ Bias} = \left\{\frac{m_{t,biased} - m_{t,correct}}{m_{t,correct}}\right\} * 100\% \approx \left\{\frac{\sqrt{\Delta P_{t,read}}}{\sqrt{\Delta P_{t,inf}}} - 1\right\} * 100\% \tag{24}$$

$$\% \text{ Bias} \approx \left\{\frac{\sqrt{61.08}}{\sqrt{64.56}} - 1\right\} * 100\% = -2.7\% \tag{24a}$$

Alternatively, as the diagnostic pattern recognition has identified $\Delta P_r$ and $\Delta P_{PPL}$ as correctly read, the correct mass flow rates can be predicted by equations 4 and 5 respectively. This can be compared to the meter's erroneous flow rate output to derive the bias=−2.7%.

In this this DP reading error example the problem is caused by a leaking manifold. However, the same principle holds for any source of DP reading error, e.g. when a DP transmitter is over-ranged, drifting, wrongly calibrated etc.

5.2 Erroneous Inlet Diameter Entry

A common problem with DP meters is the use of the wrong keypad entered inlet diameter values to the flow calculation. Traditionally this went un-noticed, but the use of the prior art DP meter diagnostic suite can now warn of an unspecified problem, and offers a short list of possible causes that includes 'erroneous inlet diameter'. That is the limit of the prior art. However, it will now be shown with the use of this new methodology a system can also assign an associated flow prediction bias to this malfunction source.

A 4", sch 40, 0.66 orifice meter was tested at a water flow facility. The inlet diameter was 4.026", and the orifice bore was 2.416". The flow conditions were a mass flow of 19.42 kg/s, a Reynolds number of 520,620, and a traditional, recovered, and PPL DPs of 51.54 kPa, 18.75 kPa and 32.74 kPa respectively, producing read PLR of 0.6363, an ISO $C_d$ prediction of 0.607 and an PLR baseline prediction of 0.6355. The flow prediction and reference agreed to <0.5%, i.e. the meter is serviceable.

FIG. 10 shows the DP meter diagnostic suite's response for use of the correct geometry (left side graph) and for use of an arbitrary chosen erroneous inlet diameter of 3.79" instead of 4.026" (right side graph). The left hand graph shows the meter is operating correctly. The right hand graph shows a pattern that is indicative of a few possible malfunction sources, and excludes all other common malfunction sources. The DP integrity check $x_4$ shows the DP readings are trustworthy. An erroneous low inlet diameter entry is one of the few possible sources that can produce this result. That is the limit of the prior art.

This new development can predict the associated flow prediction bias. The keypad entered geometry suggests the β=d/D=2.416"/3.79"=0.637. Now select objective diagnostic $y_1$ (or more specifically a %). This is based on the PLR objective check. The real β (and not the erroneous β) dictates the actual PLR. As diagnostic $x_4$ confirms the DPs are read correctly, from equation 19 we can say $\beta_{inferred}=f(PLR_{read})$. The PLR reading equation 19 predicts the actual beta via the read PLR of 0.6363.

$$PLR = f(\beta) \tag{19}$$

$$\beta = d/D = f(PLR_{read}) = f(0.6363) = 0.6004 \tag{19a}$$

The objective diagnostic $y_1$ (i.e. PLR based analysis) has now predicted the beta to be 0.6004. The inlet diameter is therefore predicted as D=d/β=2.416"*0.6004=4.024". The correct answer is 4.026". The bias on the flow prediction can now be directly calculated, see equation 25. The erroneous inlet diameter $D_{biased}=3.79$" produced $\beta_{biased}=0.637$, and this method gives a predicted geometry of D=4.024" and β=0.6004. In this worked example for simplicity it is reasonably assumed that $(\varepsilon C_d)_{biased} \approx \varepsilon C_d$, however in practice a flow computer software would also calculate this second order effect. Equation 25 therefore estimates the flow prediction bias induced by the erroneous inlet diameter is =−2.1%. FIG. 11 shows the objective diagnostic parameter a % (i.e. the un-normalised $y_1$ value) being used to predict the magnitude of the source of the problem (i.e. the percentage bias in the inlet diameter) and from there the associated percentage flow prediction bias.

$$\% \text{ Bias} = \left\{ \frac{m_{t,biased} - m_{t,correct}}{m_{t,correct}} \right\} * 100\% \approx \quad (25)$$

$$\left\{ \left( \frac{D_{biased} \beta_{biased}}{D \beta} \right)^2 \sqrt{\frac{1 - \beta_{biased}^4}{1 - \beta^4}} - 1 \right\} * 100\%$$

5.3 Erroneous Orifice Diameter Entry

The orifice meter diameter value may be erroneously entered into the flow calculation. Traditionally this went un-noticed, but the use of the prior art of DP meter diagnostic suite can now warn of an unspecified problem, and offers a short list of possible causes that includes 'erroneous orifice diameter'. That is the limit of the prior art. However, it will now be shown with the use of this new methodology a system can also assign an associated flow prediction bias to this malfunction source.

For the same data set as discussed in example 5.2 (while using the correct inlet diameter) consider the case where the true orifice diameter of 2.416" was erroneously entered as 2.516". FIG. 12 shows the DP meter diagnostic suite's response for use of the correct geometry (left side graph) and for use of an arbitrary chosen erroneous orifice diameter (right side graph). The left hand graph shows the meter is operating correctly. The right hand graph shows a pattern that is indicative of a few possible malfunction sources, and excludes all other common malfunction sources. The DP integrity check $x_4$ shows the DP readings are trustworthy. An erroneous high orifice diameter entry is one of the few possible sources that can produce this diagnostic pattern. That is the limit of the prior art.

This new development can predict the associated flow prediction bias. The keypad entered geometry suggests $\beta = d/D = 2.516"/4.026" = 0.625$. Again we can select objective diagnostic $\alpha_\%$ and predict the actual beta from the read PLR. As the DP integrity check $x_4$ indicates the DPs are correct we can trust the read PLR, and this again predicts the beta via equation 19 as 0.6004. Hence, the actual inlet diameter is derived: $d = D\beta = 4.026" * 0.6004 = 2.417"$. (The actual value is 2.416").

$$\% \text{ Bias} = \left\{ \frac{m_{t,biased} - m_{t,correct}}{m_{t,correct}} \right\} * 100\% \approx \quad (26)$$

$$\left\{ \left( \frac{\beta_{biased}}{\beta} \right)^2 \sqrt{\frac{1 - \beta^4}{1 - \beta_{biased}^4}} - 1 \right\} * 100\%$$

The erroneous orifice diameter induced flow prediction bias can now be directly calculated, see equation 26. The erroneous (or 'biased') beta is $\beta_{biased} = 0.625$, and the predicted beta is $\beta_{biased} = 0.6004$. Again, in this worked example for simplicity it is reasonably assumed that $(\varepsilon C_d)_{biased} \approx \varepsilon C_d$, however in practice a flow computer software would also calculate the second order effect. Equation 26 therefore estimates the flow prediction bias induced by the erroneous inlet diameter is $\approx +9.8\%$. FIG. 13 shows the objective diagnostic parameter a % being used to predict the magnitude of the source of the problem (i.e. the percentage bias in the orifice diameter) and from there the associated percentage flow prediction bias.

5.4 Worn Orifice Edge

An orifice plate should have a sharp perpendicular edge. Worn orifice plates cause the meter to have a negative flow prediction bias. Traditionally this went un-noticed, but the use of the prior art of DP meter diagnostic suite can now warn of an unspecified problem, and offers a short list of possible causes that includes 'erroneous orifice diameter'. That is the limit of the prior art. However, it will now be shown with the use of this new methodology a system can also assign an associated flow prediction bias to this malfunction source.

A problem when discussing wear on an orifice plate is what parameter should be used to quantify it? Wear is never the same on any two plates. However, modeling the wear as a symmetrical chamfer with height/depth 'l', i.e. as a wear height (l) to orifice diameter 'd', (l/d ratio), see FIG. 14, gives reasonable predictive results.

The inventor tested plates with varying degrees of worn edge. This worn edge vs. flow prediction bias data matched the little $3^{rd}$ party data in existence (see right of FIG. 15). Traditionally this data is only used to warn against using a worn edge plate, or to back calculate an orifice meter's flow prediction bias if routine maintenance ever discovers a worn edge plate and the wear is then measured manually. However, the inventor recorded the worn edge (l/d) vs. objective diagnostic values vs. flow prediction bias (p %). FIG. 14 shows the description of the wear and sample diagnostic data.

FIG. 14 shows the un-normalized objective diagnostic results ($\psi\%$, $\alpha\%$), ($\lambda\%,\gamma\%$), (X $\%,\eta\%$), and ($\delta\%$,0). Whereas the DP reading integrity check ($\delta\%$) has no relationship with the edge wear, and nor should it, the other six objective diagnostic parameters do. In this case the RPR objective diagnostic check $\eta_\%$ is the most sensitive, to the l/d value (although the any of the six could be successfully used). This is the new development required for the system to not just identify a problem, and suggest a worn plate, but then to go on and estimate the magnitude of the wear, and therefore estimate the associated flow prediction bias.

FIG. 15 shows the new system estimating the amount of orifice edge wear (l/d) from the measured objective diagnostic $\eta$ % via the $l/d = f(\eta_\%)$ relationship. The last step of estimating the flow prediction bias (p %) for the estimated amount of wear (i.e. l/d) is then derived from equations stating p $\% = f(l/d)$. The difference here is traditionally that l/d value is only known if and when the meter is taken off line, the plate removed, inspected, and the damage manually measured. However, here the new system has automatically predicted it with the meter still on-line.

5.5 Backwards/Reversed Orifice Plate

Many orifice plate designs have a bevel on the back face (e.g. see FIGS. 14 and 16). Hence, orifice plates are not symmetrical. A common operational mistake is to install the orifice plate backwards such that instead of a perpendicular sharp edge being presented to the oncoming flow the bevel is presented. This induces a significant negative flow prediction bias. Traditionally this went un-noticed, but the use of the prior art of DP meter diagnostic suite can warn of a problem, and 'backwards plate' is on the short list of possible causes of that particular diagnostic pattern. That is the limit of the prior art. However, it will now be shown with the use of this new methodology a system can also assign an associated flow prediction bias to this malfunction source.

This downstream bevel (now accidentally facing upstream) is in effect the same as very severe orifice edge wear. Hence, a backward installed plate produces the same DP meter diagnostics suite pattern as a worn orifice edge, but with significantly larger co-ordinates. The new method of using the objective diagnostic parameters can now come into play. The change from a correctly installed plate to a backwards plate is a change from one precise geometry to another. That is, a backward plate always produces the same predictable step shift in all six objective diagnostic parameters (the seventh $x_4$ being unaffected). With the DP integrity check ($x_4$) giving assurance the DPs are read correctly, the reproducible tell-tale six objective diagnostic check results (i.e. specific values for $\Psi\%$, $\alpha\%$, $\lambda\%$, $\gamma\%$, X %, and $\eta\%$) are indicative of a 'backwards plate'. In this case examination of the six objective diagnostics has confirmed the precise geometry (l/d) shift—i.e. the bevel geometry l/d.

The last step of estimating the flow prediction bias (p %) for a backward plate is derived from equations stating p $\%=f(D,\beta,E,e,)$, where E and e are defined in FIG. 16. However, without this objective diagnostic check confirming the issue is precisely a backwards plate with a specific geometry change, this published equation is only ever applied after the mis-measurement has already taken place to back calculate the true flow. Use of the objective diagnostics allows the problem to be identified and the actual flow rate to be predicted while the plate is still installed backwards.

5.6 Buckled/Warped/Bent Orifice Plates

An orifice plate should be perpendicular to the flow. Buckled (i.e. 'warped'/'bent') orifice plates cause the meter to have a negative flow prediction bias. Traditionally this went un-noticed, but the use of the prior art of DP meter diagnostic suite can now warn of an unspecified problem, and offers a short list of possible causes that includes 'buckled plate'. That is the limit of the prior art. However, it will now be shown with the use of this new methodology a system can also assign an associated flow prediction bias to this malfunction source.

A problem when discussing buckling of an orifice plate is what parameter should be used to quantify it? Modeling the buckling as a symmetrical buckle with depth a, i.e. as a buckle depth (a) to meter inlet diameter 'D', (a/D ratio), see FIG. 17, gives reasonable predictive results.

The inventor tested plates with varying degrees of buckling. This buckle (a/D) vs. flow prediction bias (p %) data matched existing $3^{rd}$ party data. Traditionally this data is only used to warn against using a buckled plate, or to back calculate an orifice meter's flow prediction bias if routine maintenance ever discovers a buckled plate and the size of the buckle is then measured manually. However, the inventor recorded the buckle (a/D) vs. objective diagnostic values vs. flow prediction bias (p %). FIG. 17 shows the description of the buckle and sample diagnostic data.

FIG. 17 shows the un-normalized objective diagnostic results. Whereas the DP reading integrity check (6%) has no relationship with the buckle, and nor should it, the other six objective diagnostic parameters do. In this case the RPR objective diagnostic check n % is the most sensitive to the $\sigma/D$ value (although any of the six could be successfully used). This is the new development required for the system to not just identify a problem, and suggest a buckled plate, but then to go on and estimate the magnitude of the buckle, and therefore estimate the associated flow prediction bias.

FIG. 18 shows the new system (using a small sample data set) estimating the magnitude of the buckle ($\sigma/D$) from the measured objective diagnostic $\eta$ % via the $\sigma/D=f(\eta_\%)$ relationship The last step of estimating the flow prediction bias (p %) for the estimated magnitude of buckle (i.e. $\sigma/D$) is then derived from equations stating p $\%=f(\sigma/D)$. The difference here is traditionally that $\sigma/D$ value is only known if and when the meter is taken off line, the plate removed, inspected, and the damage manually measured. However, here the new system has automatically predicted it with the meter still on-line.

6. Summary

Traditionally most DP meters are operated with no diagnostic system. In recent years with the development of a DP meter diagnostic suite (U.S. Pat. No. 8,136,414) some DP meters now have diagnostic capabilities. The state of the art of DP meter diagnostic suites show when there is a problem, and sometimes specify the particular problem (e.g. DP reading, backward plate, wet gas etc.) and other times short list the few problems that can cause such a diagnostic pattern. This is the application of pattern recognition to flow meter diagnostics. The DP meter diagnostic suite, like all flow meter diagnostic suites, consists of both objective and subjective diagnostic checks. However, the DP meter is unusual in that most (i.e. seven of the eight) diagnostic checks are objective.

Presently no flow meter system has a diagnostic system that states if there is a problem, what that problem may be, and what the associated flow prediction bias would be. The inventor has further developed the DP meter diagnostic system. When a problem is identified, or a list of potential problems are listed, for most common issues, the objective diagnostics can then be used to quantify the magnitude of the problem thereby allowing the associated flow prediction bias to be estimated.

If the diagnostic pattern recognition has isolated the specific problem the new development's associated flow prediction bias estimate effectively tells the operator the approximate correct flow rate while the meter remains in service and maintenance is organized. For the case of pattern recognition producing a short list of possible malfunctions, the new development will assign associated flow prediction biases to the individual possibilities. Knowledge is power. This gives the meter users information unavailable before, i.e. they now know the relative risk they are running by continuing to run the meter/or shutting down the meter. If the worst case scenario flow bias cited is acceptable there is no need to shut the system down.

Various improvements and modifications can be made to the above without departing from the scope of the disclosure.

The invention claimed is:

1. A method of metering fluid flow, comprising:
 making one or more fluid flow rate measurements;
 performing one or more objective diagnostic tests on meter performance characteristics;
 performing one or more subjective diagnostic tests on meter performance characteristics;
 identifying a specific problem based on outputs of the objective and subjective diagnostic tests on meter performance characteristics;
 selecting one or more of the one or more objective diagnostic tests on meter performance characteristics appropriate to the identified specific problem;
 relating measurements from the one or more selected objective diagnostic tests on meter performance characteristics appropriate to the identified specific problem to quantify the magnitude of the specific problem via analysis of the selected objective diagnostic tests; and
 predicting a quantified fluid flow rate bias based on the quantified magnitude of the specific problem.

2. The method of claim 1, wherein identifying a specific problem comprises applying pattern recognition to the results of the performed objective and subjective diagnostic tests.

3. The method of claim 1, further comprising applying quantified fluid flow rate bias as a correction factor to derive a true fluid flow rate from a measured fluid flow rate.

4. The method of claim 1, being applied while a flow metering device is in-situ.

5. The method of claim 1, wherein measuring a fluid flow rate comprises measuring a differential pressure and calculating a flow rate based on said measured differential pressure.

6. The method of claim 5, wherein measuring one or more fluid flow rates comprises measuring two or more of a traditional differential pressure, a recovered differential pressure and a permanent pressure loss differential pressure.

7. In a fluid flow metering system, using objective and subjective diagnostic tests on meter performance characteristics in combination to identify a specific problem, and then using one or more selected objective diagnostic tests on meter performance characteristics appropriate to the identified problem to determine a quantified magnitude of the problem and to predict a quantified flow bias.

8. A flow metering system comprising a flow meter and a flow analyzer, the flow analyzer comprising:
 (i) a diagnostics suite configured to make one or more fluid flow rate measurements, perform one or more objective diagnostic tests on meter performance characteristics, perform one or more subjective diagnostic tests on meter performance characteristics and identify a specific problem based on outputs of the objective and subjective diagnostic tests on meter performance characteristics and select one or more of the one or more objective diagnostic tests on meter performance characteristics appropriate to the identified specific problem; and
 (ii) a bias prediction module comprising a computer with a program stored thereon, wherein the bias prediction module is configured to relate measurements from one or more selected objective diagnostic tests appropriate to the identified specific problem to quantify the magnitude of the specific problem, and predict a quantified fluid flow rate bias based on the quantified magnitude of the specific problem.

9. The flow metering system of claim 8, wherein identifying a specific problem comprises applying pattern recognition to the results of the performed objective and subjective diagnostic tests.

10. The flow metering system of claim 8, wherein the flow analyzer is further configured to apply said quantified fluid flow rate bias as a correction factor to derive a true fluid flow rate from a measured fluid flow rate.

11. The flow metering system of claim 8, wherein the flow analyzer is arranged to predict a quantified fluid flow rate bias based on the quantified magnitude of the specific problem while the flow meter is in-situ.

12. The flow metering system of claim 8, wherein the flow meter comprises a differential pressure fluid flow meter.

13. The flow metering system of claim 12, wherein the differential pressure fluid flow meter comprises one of: a venturi meter, a cone meter, an orifice plate meter.

14. The flow metering system of claim 12, wherein the differential pressure fluid flow meter is provided with a plurality of pressure taps that are arranged to provide two or more of a traditional differential pressure, a recovered differential pressure and a permanent pressure loss differential pressure.

15. A computer program product comprising:
 (i) a diagnostics suite configured to make one or more fluid flow rate measurements, perform one or more objective diagnostic tests on meter performance characteristics, perform one or more subjective diagnostic tests on meter performance characteristics, and identify a specific problem based on outputs of the objective and subjective diagnostic tests on meter performance characteristics and select one or more of the one or more objective diagnostic tests on meter performance characteristics appropriate to the identified specific problem; and
 (ii) a bias prediction module comprising a computer with a program stored thereon, wherein the bias prediction module is configured to relate measurements from one or more selected objective diagnostic tests appropriate to the identified specific problem to quantify the magnitude of the specific problem, and predict a quantified fluid flow rate bias based on the quantified magnitude of the specific problem.

* * * * *